US012780186B2

(12) United States Patent
Ogata

(10) Patent No.: US 12,780,186 B2
(45) Date of Patent: Nov. 3, 2026

(54) DRIVING ASSISTANCE DEVICE WITH OBSTACLE COLLATION FOR TRAVEL ASSISTANCE CONTROL

(71) Applicant: Hitachi Astemo, Ltd., Hitachinaka (JP)

(72) Inventor: Takehito Ogata, Schwaig-Oberding (DE)

(73) Assignee: Hitachi Astemo, Ltd., Ibaraki (JP)

( * ) Notice: Subject to any disclaimer, the term of this patent is extended or adjusted under 35 U.S.C. 154(b) by 73 days.

(21) Appl. No.: 18/847,459

(22) PCT Filed: Mar. 15, 2023

(86) PCT No.: PCT/JP2023/010136
§ 371 (c)(1),
(2) Date: Sep. 16, 2024

(87) PCT Pub. No.: WO2023/218755
PCT Pub. Date: Nov. 16, 2023

(65) Prior Publication Data

US 2025/0242800 A1 Jul. 31, 2025

(30) Foreign Application Priority Data

May 11, 2022 (JP) ................................ 2022-078071

(51) Int. Cl.
*B60W 30/09* (2012.01)
*B60W 50/02* (2012.01)

(52) U.S. Cl.
CPC ............ *B60W 30/09* (2013.01); *B60W 50/02* (2013.01); *B60W 2520/06* (2013.01); (Continued)

(58) Field of Classification Search
None
See application file for complete search history.

(56) References Cited

U.S. PATENT DOCUMENTS 9,830,826 B2 * 11/2017 Suzuki .................. G08G 1/166
10,370,031 B2 * 8/2019 Kim .................... G05D 1/0219
11,891,064 B2 * 2/2024 Günzel ................ G05D 1/0221

FOREIGN PATENT DOCUMENTS

JP 2007-237930 A 9/2007
JP 2008302711 A * 12/2008
(Continued)

OTHER PUBLICATIONS

International Search Report, PCT/JP2023/010136, May 23, 2023.

*Primary Examiner* — Abdhesh K Jha
(74) *Attorney, Agent, or Firm* — Volpe Koenig

(57) ABSTRACT

Provided is a driving assistance device that is safe and convenient in a situation where reverse playback cannot be performed in passing each other on narrow paths or the like. Driving operation of driver and surrounding obstacle information are stored at forward movement. At this time, the information of the front sensor (or the front camera) and the information of the rear sensor are integrated to determine and store the object type (stationary object, moving object). After the backward movement assistance is started, the surrounding obstacles of the rear sensor are collated with the stored surrounding obstacles, and execution of the backward movement assistance based on the stored driving operation is determined according to the collation result.

15 Claims, 31 Drawing Sheets

(52) U.S. Cl.
CPC ... *B60W 2554/20* (2020.02); *B60W 2554/402* (2020.02); *B60W 2554/4041* (2020.02); *B60W 2556/65* (2020.02)

(56) References Cited

FOREIGN PATENT DOCUMENTS

| | | | | |
|---|---|---|---|---|
| JP | 2012173843 | A | * | 9/2012 |
| JP | 2016-085484 | A | | 5/2016 |

* cited by examiner 10
14
23
Car
P

FIG. 27

| | OBJECT TYPE DETERMINATION METHOD | KNOWN TECHNIQUE | PRESENT EMBODIMENT (BEHAVIOR CHANGE) |
|---|---|---|---|
| PEDESTRIAN OR BICYCLE MOVES | COLLATION OF FRONT AND REAR SENSORS, FRONT CAMERA | CALL FOR ATTENTION AND MANUAL SWITCHING | MOVING OBJECT: CONTROL IS PERFORMED AS IT IS<br>NO SENSOR IS DETECTED: ATTENTION IS ATTRACTED TO DRIVER |
| FOLLOW-UP VEHICLE | COLLATION OF FRONT AND REAR SENSORS | REVERSE PLAYBACK IS NOT POSSIBLE WHEN THE FOLLOW-UP VEHICLE IS NOT PRESENT ON THE WAY | THERE IS NO FOLLOW-UP VEHICLE: REVERSE PLAYBACK<br>THERE IS FOLLOW-UP VEHICLE: FOLLOWING CONTROL |
| THERE IS FOLLOWING BICYCLE OR TWO-WHEELED VEHICLE | COLLATION OF FRONT AND REAR SENSORS | START REVERSE PLAYBACK WHEN BACKWARD MOVEMENT STARTS | CALL FOR ATTENTION AND MANUAL SWITCHING AT START OF BACKWARD MOVEMENT |
| TANDEM STOPPED VEHICLE DISAPPEARS | FRONT CAMERA | (KNOW THAT THERE IS CHANGE)<br>CALL FOR ATTENTION AND MANUAL SWITCHING | IT IS POSSIBLE TO PERFORM EVACUATION CONTROL TO EMPTY SPACE |
| CONSTRUCTION AREA OR FENCE AT CONSTRUCTION SITE MOVES | FRONT CAMERA | (KNOW THAT THERE IS CHANGE)<br>CALL FOR ATTENTION AND MANUAL SWITCHING | EVACUATION CONTROL CAN BE PERFORMED IF THERE IS EMPTY SPACE |
| BICYCLE OR TWO-WHEELED VEHICLE DISAPPEARS | FRONT CAMERA | (KNOW THAT THERE IS CHANGE)<br>CALL FOR ATTENTION AND MANUAL SWITCHING | CONTROL IS PERFORMED ASSUMING THAT THERE IS NO ONE |

DRIVING ASSISTANCE DEVICE WITH OBSTACLE COLLATION FOR TRAVEL ASSISTANCE CONTROL

TECHNICAL FIELD

The present invention relates to a driving assistance device that assists driving of a vehicle.

BACKGROUND ART

In order to prevent traffic accidents, various driving assistance functions from a high-speed range to a low-speed range are required. As one of driving assistance systems in a low-speed range, there is a backward movement assistance system that stores a travel history on a narrow path and assists backward travel by reverse playback of a stored travel route at the time of a dead end, passing, or the like.

PTL 1 discloses a method of storing a travel history and a surrounding environment at the time of forward movement, comparing the surrounding environment stored at the time of backward movement with a current surrounding environment, performing assistance by reverse playback when there is no difference, and calling attention to a driver when there is a difference.

CITATION LIST

Patent Literature

PTL 1: JP 2007-237930 A

SUMMARY OF INVENTION

Technical Problem

However, even when there is a difference between the surrounding environment stored at the time of backward movement and the current surrounding environment, appropriate assistance should be performed according to what kind of difference there is. For this purpose, it is necessary to precisely perform the comparison at the time of backward movement.

In PTL 1 described above, for example, when a stored obstacle is lost as a result of comparison with the stored obstacle, it is not possible to determine whether the obstacle is lost due to movement by a moving object such as a stopped vehicle or a pedestrian at the time of backward movement or cannot be detected due to a failure of a sensor at the time of backward movement, and the reverse playback cannot be performed. In addition, since each follow-up vehicle is stored when the follow-up vehicle is present at the time of forward movement, for example, when the follow-up vehicle is not present on the way, comparison at the time of backward movement cannot be performed correctly, and reverse playback cannot be performed.

The present invention has been made in view of the above circumstances, and an object of the present invention is to provide a safe and convenient driving assistance device in a situation where reverse playback cannot be performed in passing or the like on a narrow path.

Solution to Problem

In order to solve the above problems, a driving assistance device according to the present invention includes: a driving operation acquisition unit that acquires a driving operation of a driver of a host vehicle; a first observation information acquisition unit that acquires first observation information of a first observation unit that observes a surrounding situation of the host vehicle; a second observation information acquisition unit that acquires second observation information of a second observation unit that observes a direction different from a direction of the first observation unit in the surrounding situation of the host vehicle; an obstacle determination unit that determines at least a stationary object and other objects among obstacles by using first observation information of the first observation unit and second observation information of the second observation unit when the host vehicle travels; a storage unit that stores at least a stationary object among the obstacles determined by the obstacle determination unit and the driving operation acquired by the driving operation acquisition unit; a surrounding situation collation unit that collates an obstacle obtained from the first observation unit or the second observation unit with an obstacle stored in the storage unit when the host vehicle travels on a route on which the host vehicle has traveled again; and a travel assistance control unit that assists driving travel based on a driving operation stored in the storage unit during traveling of the host vehicle when the host vehicle travels again on a route on which the host vehicle has traveled, in which the travel assistance control unit determines whether to provide travel assistance according to a result of the collation obtained by the surrounding situation collation unit.

Further, a driving assistance device according to the present invention includes: a driving operation acquisition unit that acquires a driving operation of a driver of a host vehicle; a front observation information acquisition unit that acquires front observation information of a front observation unit that observes a surrounding situation in front of the host vehicle; a rear observation information acquisition unit that acquires rear observation information of a rear observation unit that observes a surrounding situation behind the host vehicle; an obstacle determination unit that determines at least a stationary object and other objects among obstacles by using front observation information of the front observation unit and rear observation information of the rear observation unit when the host vehicle moves forward; a storage unit that stores at least a stationary object among the obstacles determined by the obstacle determination unit and the driving operation acquired by the driving operation acquisition unit; a surrounding situation collation unit that collates an obstacle behind the host vehicle obtained by the rear observation unit with the stationary object stored by the storage unit when the host vehicle moves backward along a route where the host vehicle has moved forward; and a reverse playback backward movement assistance control unit that assists backward travel by reverse playback of a driving operation stored in the storage unit when the host vehicle moves forward, when the host vehicle moves backward along a route where the host vehicle has moved forward, in which the reverse playback backward movement assistance control unit determines whether the reverse playback backward movement assistance is performed according to a result of the collation obtained by the surrounding situation collation unit.

Advantageous Effects of Invention

According to the present invention, since moving objects such as a stopped vehicle and a pedestrian are distinguished and stored, it is possible to recognize that a moving object such as a stopped vehicle and a pedestrian present at the time of forward movement has moved and lost at the time of backward movement. Similarly, in a case where an area stored as an obstacle that does not move (stationary object) cannot be currently detected, it is possible to recognize that the area cannot be detected due to a failure of a sensor or the like at the time of backward movement.

Furthermore, even in a case where a follow-up vehicle is present at the time of forward movement, the follow-up vehicle and surrounding obstacles are stored in a distinguished manner. Therefore, for example, even in a case where there is no follow-up vehicle on the way, comparison at the time of backward movement can be correctly performed.

Therefore, it is possible to provide a safe and convenient driving assistance device in a situation where reverse playback cannot be performed in passing or the like on a narrow path.

Problems, configurations, and effects other than those described above will be clarified by the following description of embodiments.

BRIEF DESCRIPTION OF DRAWINGS

FIG. 4A is an explanatory diagram illustrating an example of a scene, FIG. 4B is an explanatory diagram illustrating detection situations of sensors 13 and 14 at a position (time t−Δt) on the left side of FIG. 4A, FIG. 4C is an explanatory diagram illustrating a front sensor obstacle map created at a position (time t−Δt) on the left side of FIG. 4A, FIG. 4D is an explanatory diagram illustrating a rear sensor obstacle map created at a position (time t−Δt) on the left side of FIG. 4A, FIG. 4E is an explanatory diagram illustrating the detection situations of the sensors 13 and 14 at a position (time t) on the right side of FIG. 4A, FIG. 4F is an explanatory diagram illustrating a front sensor obstacle map created at a right position (t), FIG. 4G is an explanatory diagram illustrating a rear sensor obstacle map created at a position (time t) on the right side of FIG. 4A, and FIG. 4H is an explanatory diagram illustrating a created type map.

FIG. 16A is an explanatory diagram illustrating an example of a scene, FIG. 16B is an explanatory diagram illustrating a detection situation of the sensors 23 and 14 at a position (time t−Δt) on the left side of FIG. 16A, FIG. 16C is an explanatory diagram illustrating a front sensor obstacle map created at a position (time t−Δt) on the left side of FIG. 16A, FIG. 16D is an explanatory diagram illustrating a rear sensor obstacle map created at a position (time t−Δt) on the left side of FIG. 16A, FIG. 16E is an explanatory diagram illustrating a detection situation of the sensors 23 and 14 at a position (time t) on the right side of FIG. 16A, FIG. 16F is an explanatory diagram illustrating a front sensor obstacle map created at a position (time t) on the right side of FIG. 16A, FIG. 16G is an explanatory diagram illustrating a rear sensor obstacle map created at a position (time t) on the right side of FIG. 16A, FIG. 16H is an explanatory diagram illustrating a created type map (superimposition of FIG. 16F and FIG. 16G), and FIG. 16I is an explanatory diagram illustrating a created type map (object type assignment).

FIG. 27 is an explanatory diagram of an application scene example and an operation example of the driving assistance device according to the present invention.

DESCRIPTION OF EMBODIMENTS

Figure 1:
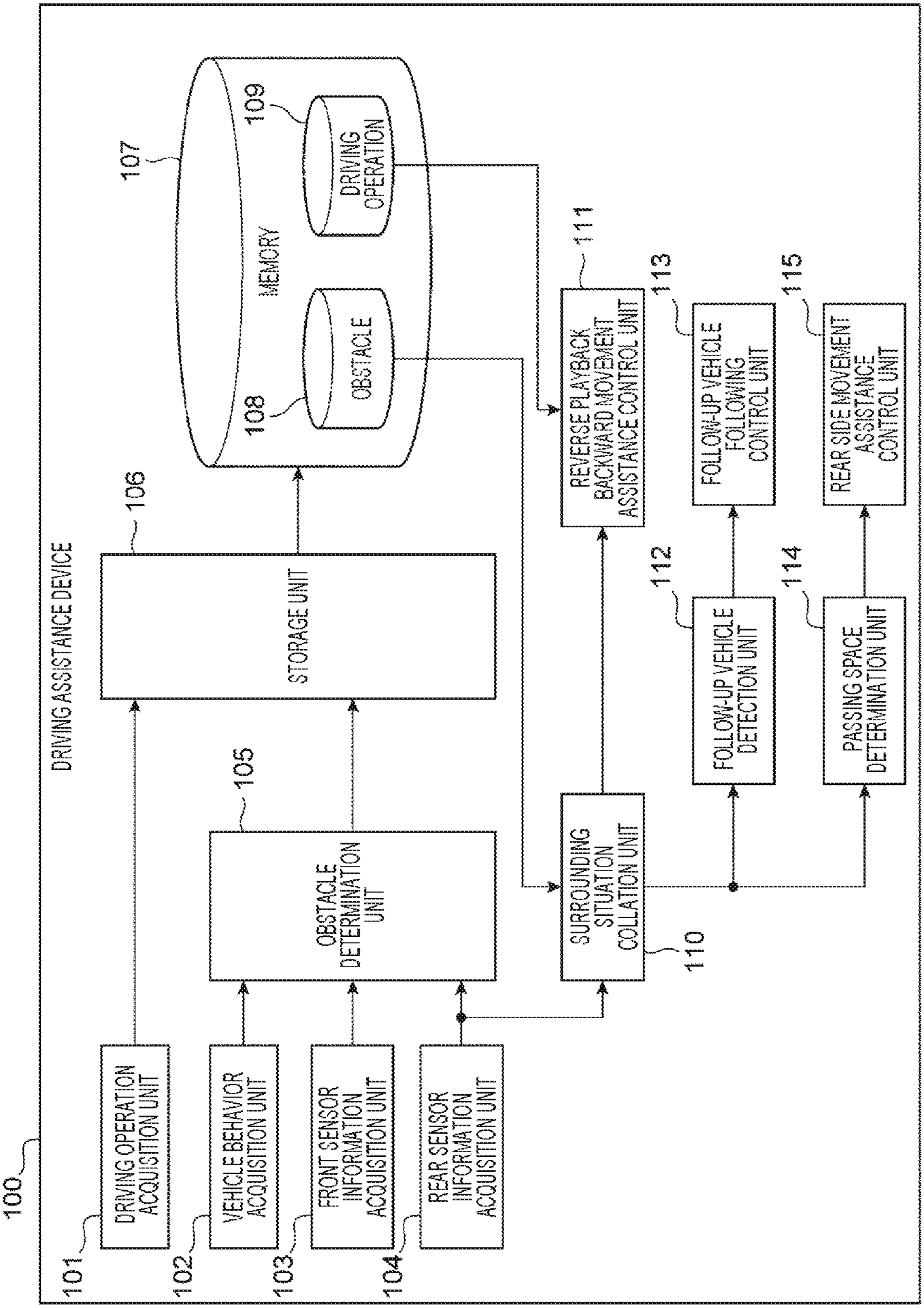
FIG. 1 is a system configuration diagram of a driving assistance device according to a first embodiment of the present invention.

Hereinafter, embodiments of the present invention will be described with reference to the drawings. In the following description, parts having the same functions are denoted by the same reference numerals, and repeated description thereof may be omitted.

First Embodiment

First, a driving assistance device according to a first embodiment of the present invention will be described with reference to FIGS. 1 to 12.

System Configuration of Driving Assistance Device

FIG. 1 is a system configuration diagram of a driving assistance device 100 according to a first embodiment of the present invention. The driving assistance device 100 is a device that is mounted on a vehicle (host vehicle) 10 and assists driving operation of a driver by electronically controlling functional units included in the vehicle 10. The driving assistance device 100 according to the present embodiment is an apparatus that assists (backward movement assistance control) backward travel (that is, the driving operation when the vehicle 10 moves backward) of the vehicle 10 from information stored when the vehicle 10 moves forward, for example, when passing each other on a narrow path or the like.

The driving assistance device 100 is a computer that controls the vehicle 10, and executes a program stored in a storage medium to function as a driving operation acquisition unit 101, a vehicle behavior acquisition unit 102, a front sensor information acquisition unit 103, a rear sensor information acquisition unit 104, an obstacle determination unit 105, a storage unit 106, a surrounding situation collation unit 110, a reverse playback backward movement assistance control unit 111, a follow-up vehicle detection unit 112, a follow-up vehicle following control unit 113, a passing space determination unit 114, and a rear side movement assistance control unit 115.

Driving Operation Acquisition Unit 101

The driving operation acquisition unit 101 acquires a driving operation (information) of the driver of the vehicle 10 from various sensors mounted on the vehicle 10. The driving operation acquisition unit 101 acquires a driver's driving operation (information) related to acceleration/deceleration, steering, a shift position, and the like of the vehicle 10, for example, an accelerator operation, a brake operation, a steering operation (steering angle), a shift lever operation, and the like.

Vehicle Behavior Acquisition Unit 102

The vehicle behavior acquisition unit 102 acquires a behavior (information) of the vehicle 10 from various sensors mounted on the vehicle 10. The vehicle behavior acquisition unit 102 acquires, for example, behavior (information) such as a wheel speed (vehicle speed), an acceleration, and a lateral speed (yaw angle) of the vehicle 10.

Front Sensor Information Acquisition Unit 103

The driving assistance device 100 is connected to a front sensor 13 (FIGS. 2A to 2D) mounted on the vehicle 10. The front sensor 13 has a function as a front observation unit that observes a surrounding situation in front of the vehicle (host vehicle) 10. As the front sensor 13, for example, a camera that measures a distance to a surrounding object using an image, a radar that measures a distance to a surrounding object using a millimeter wave or a laser beam, a sonar that measures a distance to a surrounding object using an ultrasonic wave, or the like can be used. The front sensor 13 outputs point cloud data representing coordinates of a boundary portion of a surrounding object to the driving assistance device 100.

The front sensor information acquisition unit 103 acquires, from the front sensor 13, observation information (sensor information including point cloud data on detection of a surrounding object (obstacle) on the front of the vehicle 10) in front of the vehicle 10.

Rear Sensor Information Acquisition Unit 104

The driving assistance device 100 is connected to the rear sensor 14 (FIGS. 2A to 2D) mounted on the vehicle 10. The rear sensor 14 has a function as a rear observation unit that observes a surrounding situation behind the vehicle (host vehicle) 10. As the rear sensor 14, for example, a camera that measures a distance to a surrounding object using an image, a radar that measures a distance to a surrounding object using a millimeter wave or a laser beam, a sonar that measures a distance to a surrounding object using an ultrasonic wave, or the like can be used. The rear sensor 14 outputs point cloud data representing coordinates of a boundary portion of a surrounding object to the driving assistance device 100.

The rear sensor information acquisition unit 104 acquires, from the rear sensor 14, observation information (sensor information having point cloud data indicating detection of a surrounding object (obstacle) behind the vehicle 10) on the rear of the vehicle 10.

Configuration of Sensors 13 and 14

FIGS. 2A, 2B, 2C, and 2D illustrate mounting examples of the sensors 13 and 14 according to the first embodiment of the present invention. As described above, in the present embodiment, the front sensor 13 and the rear sensor 14 are attached to the vehicle 10 so as to observe different directions in the surrounding situation of the vehicle 10. In addition, the front sensor 13 and the rear sensor 14 are configured using sensors having the same characteristics such as a camera, a radar, and a sonar.

Figure 2A:
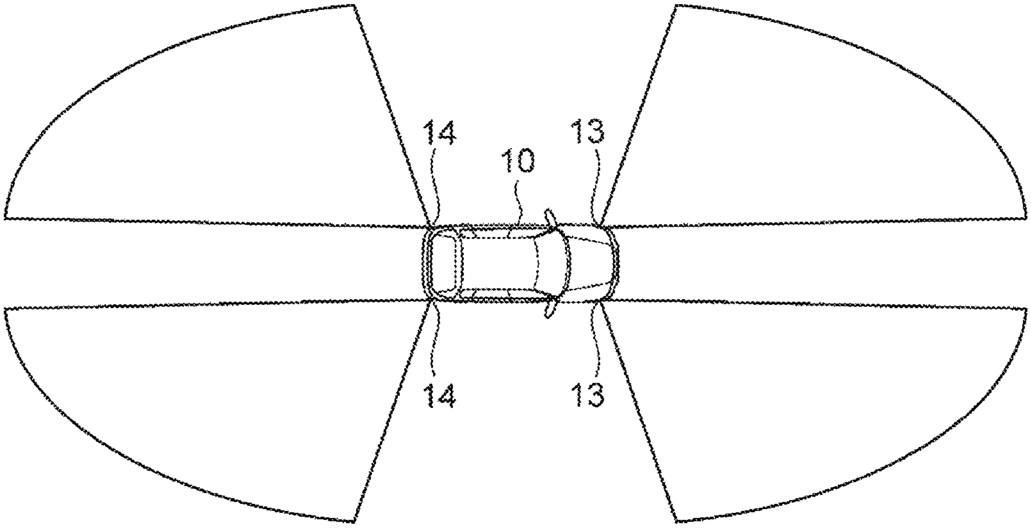
FIG. 2A is an overhead view illustrating an example (an example in which a sensor is attached to four corners of a vehicle) of a sensor attachment configuration and a sensor detection range according to the first embodiment of the present invention.
Figure 2B:
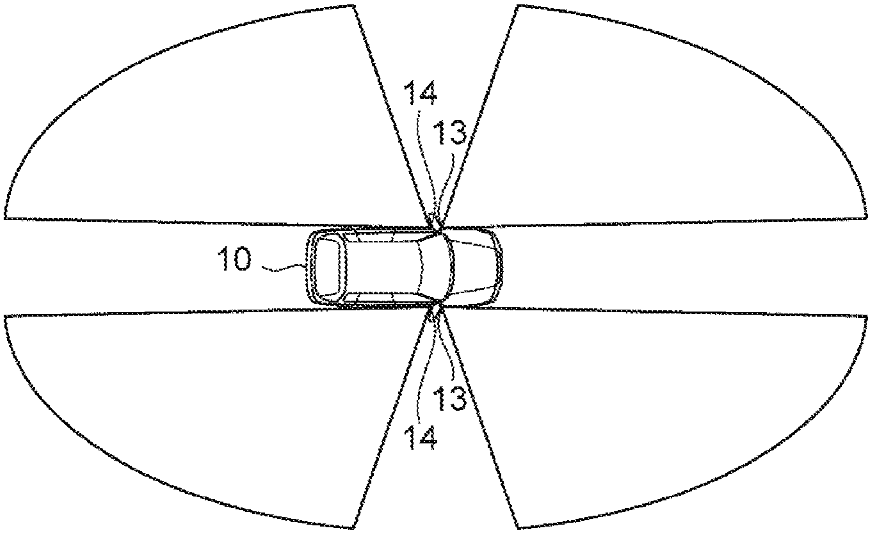
FIG. 2B is an overhead view illustrating another example (an example in which the sensor is attached to the left and right side mirrors) of the sensor attachment configuration and the sensor detection range according to the first embodiment of the present invention.
Figure 2C:
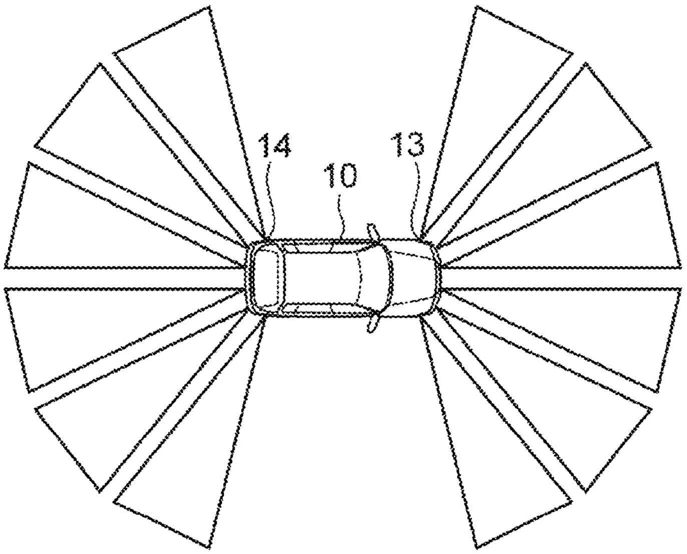
FIG. 2C is an overhead view illustrating another example (an example in which a sensor is attached to a bumper in front of and behind a vehicle) of the sensor attachment configuration and the sensor detection range according to the first embodiment of the present invention.
Figure 2D:
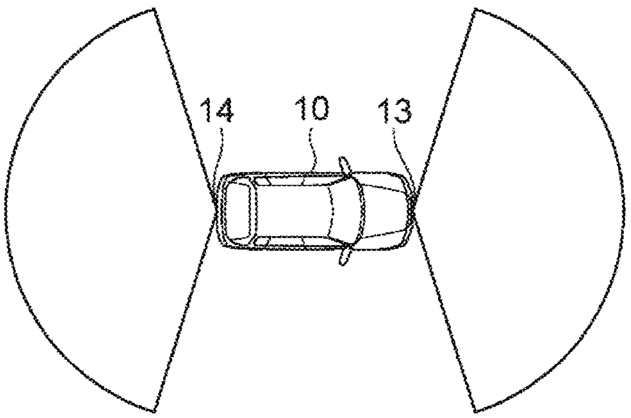
FIG. 2D is an overhead view illustrating another example (an example in which the sensor is attached to the front and rear of the vehicle) of the sensor attachment configuration and the sensor detection range according to the first embodiment of the present invention.

As an example, as illustrated in FIG. 2A, the front sensor 13 and the rear sensor 14 (for example, radar) are attached to four corners on the front, rear, left, and right of the vehicle 10. That is, (a pair of) front sensors 13 and 13 are attached to the front left and right of the vehicle 10 so as to face the front side and the side (front left side and front right side) of the vehicle 10, and (a pair of) rear sensors 14 and 14 are attached to the rear left and right of the vehicle 10 so as to face the rear side and the side (rear left side and rear right side) of the vehicle 10. As illustrated in FIG. 2B, front sensor 13 and rear sensor 14 (for example, a camera) are attached to left and right side mirrors of vehicle 10. That is, (a pair of) front sensors 13 and 13 are attached to the left and right side mirrors of the vehicle 10 so as to face the front side and the side (front left side and front right side) of the vehicle 10, and (a pair of) rear sensors 14 and 14 are attached to the left and right side mirrors of vehicle 10 so as to face the rear side and the side (rear left side and rear right side) of vehicle 10. As illustrated in FIG. 2C, front sensor 13 and rear sensor 14 (for example, sonar) are attached to front and rear bumpers of vehicle 10. That is, the plurality of front sensors 13 are attached to the bumper at the front of the vehicle 10 so as to face the front of the vehicle 10 as a whole, and the plurality of rear sensors 14 are attached to the bumper at the rear of the vehicle 10 so as to face the rear of the vehicle 10 as a whole. As illustrated in FIG. 2D, the front sensor 13 and the rear sensor 14 (for example, wide-angle camera) are attached to the front-rear center of vehicle 10. That is, the front sensor 13 is attached to the front center of the vehicle 10 so as to face the front of the vehicle 10, and the rear sensor 14 is attached to the rear center of the vehicle 10 so as to face the rear of the vehicle 10. The number, arrangement, and the like of the front sensor 13 and the rear sensor 14 are not limited to the examples of FIGS. 2A to 2D.

Obstacle Determination Unit 105

The obstacle determination unit 105 determines the object type of the obstacle around the vehicle 10 (front, rear) by using (integrating) the sensor information acquired from the front sensor information acquisition unit 103 and the rear sensor information acquisition unit 104. The obstacle determination unit 105 determines at least a stationary object and other objects (moving objects and the like) as the object type.

Figure 3:
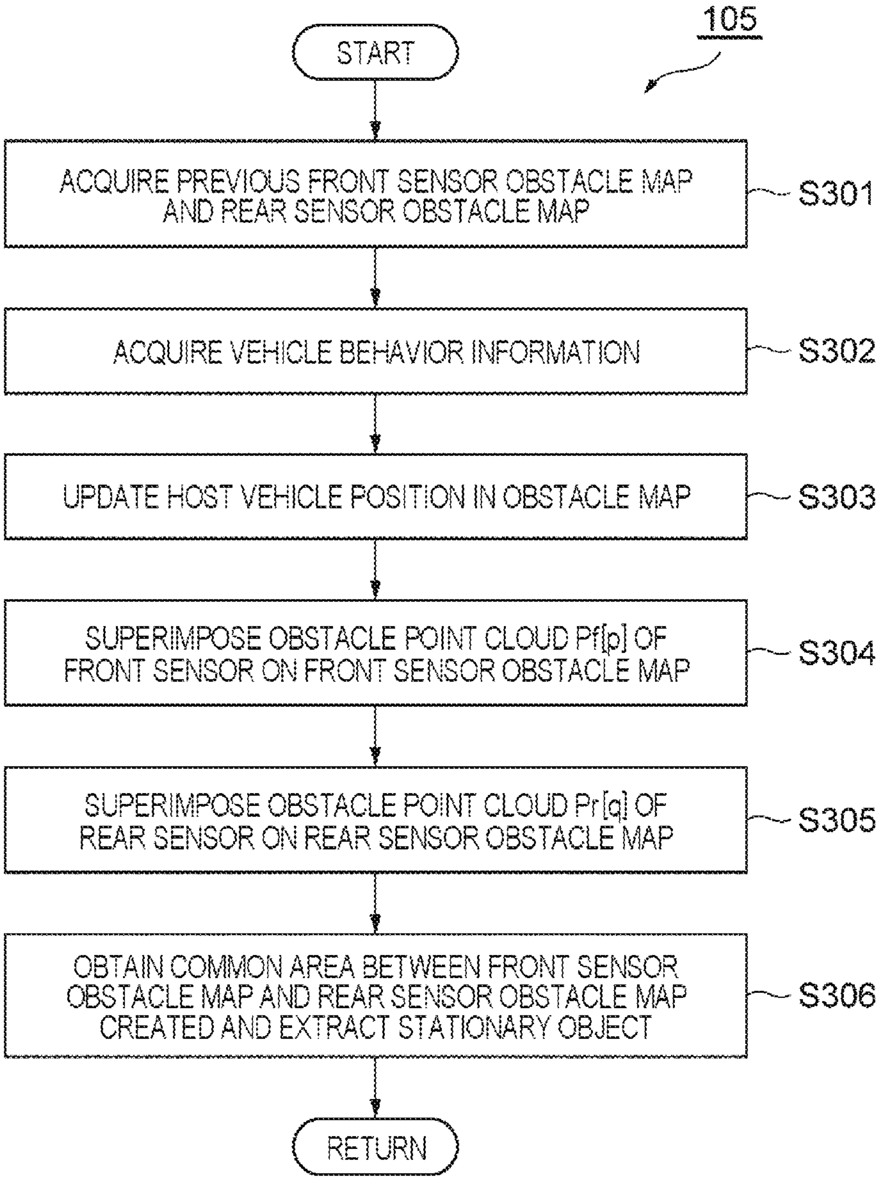
FIG. 3 is a flowchart of an obstacle determination unit according to the first embodiment of the present invention.

FIG. 3 is a flowchart of the obstacle determination unit 105 according to the first embodiment of the present invention. The flow illustrated in FIG. 3 is repeatedly performed at a predetermined processing cycle (periodically). FIG. 4 illustrates an example of obstacle determination processing by the obstacle determination unit 105 according to the first embodiment of the present invention.

Figure 4A:
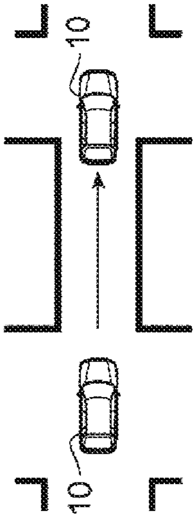
FIGS. 4A through 4H illustrates an example of obstacle determination processing performed by the obstacle determination unit according to the first embodiment of the present invention.
Figure 4B:
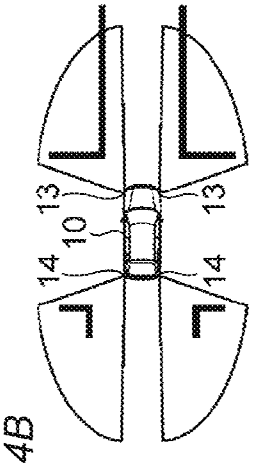
Figure 4C:
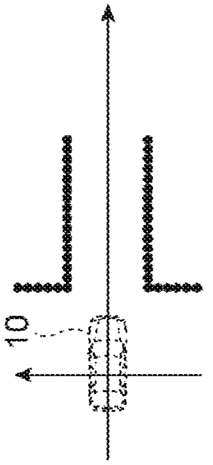
Figure 4D:
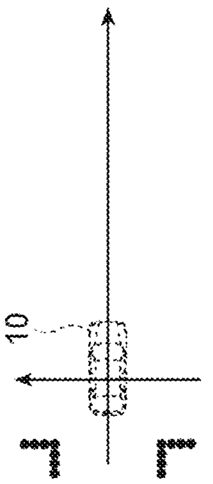
Figure 4E:
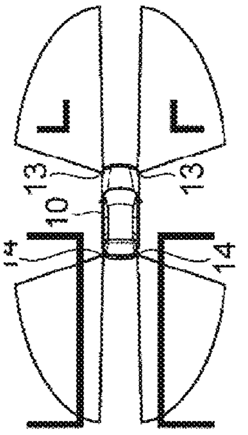
Figure 4F:
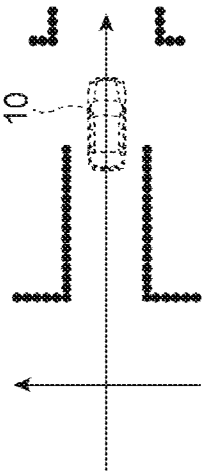
Figure 4G:
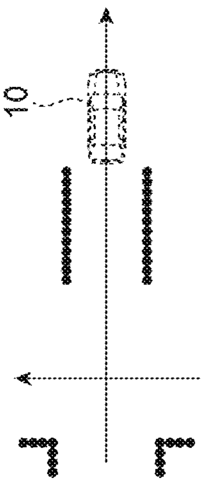
Figure 4H:
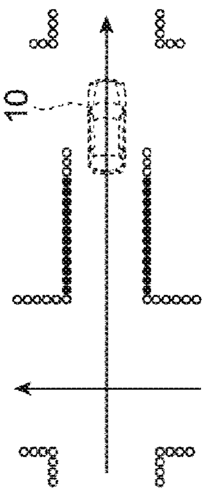

FIG. 4A illustrates a scene where the vehicle 10 is traveling from left to right on a narrow path. FIG. 4B illustrates detection situations of the sensors 13 and 14 at a position (time $t-\Delta t$) on the left side of FIG. 4A, and FIGS. 4C and 4D illustrate a front sensor obstacle map and a rear sensor obstacle map created at the position (time $t-\Delta t$) on the left side of FIG. 4A. FIG. 4E illustrates detection situations of the sensors 13 and 14 at a position (time t) on the right side of FIG. 4A, and FIGS. 4F and 4G illustrate the front sensor obstacle map and the rear sensor obstacle map created at a position (time t) on the right side of FIG. 4A. FIG. 4H illustrates a type map created by comparing (superimposing) the front sensor obstacle map of FIG. 4F and the rear sensor obstacle map of FIG. 4G. In the type map of FIG. 4H, a point cloud (black point) detected by both sensors 13 and 14 at the same position is determined as a stationary object.

The obstacle determination unit 105 arranges the sensor information (point cloud information detecting obstacles in front and rear of vehicle 10) acquired from the front sensor information acquisition unit 103 and the rear sensor information acquisition unit 104 on a map stored in advance in the memory, thereby creating (updating) the front sensor obstacle map and the rear sensor obstacle map, and storing the created maps in the memory (FIGS. 4B, 4C, and 4D).

As illustrated in FIG. 3, in S301, the obstacle determination unit 105 acquires the previous (time t−Δt, Δt: processing cycle) front sensor obstacle map and rear sensor obstacle map stored in the memory as described above (FIGS. 4C and 4D).

In S302, the vehicle behavior information is acquired from the vehicle behavior acquisition unit 102.

In S303, the host vehicle position in the front sensor obstacle map and the rear sensor obstacle map is updated using the front sensor obstacle map and the rear sensor obstacle map acquired in S301 and the vehicle behavior information acquired in S302 (FIGS. 4F and 4G).

In S304, the obstacle point cloud Pf[p] of the front sensor 13, which is the (current (time t)) sensor information (point cloud information obtained by detecting the front obstacle of the vehicle 10) acquired from the front sensor information acquisition unit 103, is superimposed on the (previous (time t−Δt)) front sensor obstacle map acquired in S301 (FIG. 4F).

In S305, the obstacle point cloud Pr[q] of the rear sensor 14, which is the (current (time t)) sensor information (point cloud information obtained by detecting the rear obstacle of the vehicle 10) acquired from the rear sensor information acquisition unit 104, is superimposed on the (previous (time t−Δt)) rear sensor obstacle map acquired in S301 (FIG. 4G).

In S306, a common area (point cloud) between the (current (time t)) front sensor obstacle map created in S304 and the (current (time t)) rear sensor obstacle map created in S305 is obtained, and the common area (point cloud) is extracted as a stationary object (FIG. 4H).

That is, the obstacle determination unit 105 determines the same obstacle (point cloud) detected by both the front sensor 13 (front sensor obstacle map) and the rear sensor 14 (rear sensor obstacle map) as a stationary object.

As a result, the obstacle determination unit 105 determines at least a stationary object and the other obstacles (moving object or the like) among the obstacles around the host vehicle 10.

Storage Unit 106

The storage unit 106 stores the obstacle (information) acquired from obstacle determination unit 105 (including the object type (information) of the obstacle determined by obstacle determination unit 105) and the driving operation (information) acquired from driving operation acquisition unit 101 in memory 107 as obstacle (information) 108 and driving operation (information) 109. The storage unit 106 stores at least a stationary object among the obstacles determined by the obstacle determination unit 105 in the memory 107 as the obstacle (information) 108.

Surrounding Situation Collation Unit 110

The surrounding situation collation unit 110 is performed when the vehicle 10 moves backward along the forward route. More specifically, the surrounding situation collation unit is performed when there is a request for execution of the backward movement assistance control from the driver of the vehicle 10 moving forward. The driver's request for execution of the backward movement assistance control can be recognized through, for example, a switch input or a touch panel input operation provided in the vehicle 10, voice recognition, a switching operation to backward movement of the shift lever, or the like.

The surrounding situation collation unit 110 collates the sensor information (in other words, obstacle information on the rear of the host vehicle obtained by the rear sensor 14) acquired from the rear sensor information acquisition unit 104 with the stationary object of the obstacle (information) 108 stored in the memory 107 by the storage unit 106.

Then, the surrounding situation collation unit 110 determines, as a moving object, an object that is not present in the stationary object of the obstacle (information) 108 stored in the memory 107 by the storage unit 106 and is present in the current sensor information (in other words, the current obstacle information on the rear of the host vehicle obtained by the rear sensor 14) acquired from the rear sensor information acquisition unit 104.

In addition, the surrounding situation collation unit 110 determines that an object that is present in the stationary object of the obstacle (information) 108 stored in the memory 107 by the storage unit 106 and is not present in the current sensor information (in other words, the current obstacle information on the rear of the host vehicle obtained by the rear sensor 14) acquired from the rear sensor information acquisition unit 104 is an object having a high possibility of failure of the sensors 13 and 14.

Reverse Playback Backward Movement Assistance Control Unit 111

The reverse playback backward movement assistance control unit 111 is performed when the vehicle 10 moves backward along a route where the vehicle has moved forward. The reverse playback backward movement assistance control unit 111 acquires the driving operation (information) 109 stored in the memory 107 by the storage unit 106 when the vehicle 10 moves forward, and assists the vehicle to travel backward (performs backward movement assistance) by the reverse playback. That is, the reverse playback backward movement assistance control unit 111 assists the backward travel by controlling a steering device, a driving device, a braking device, a transmission device, and the like so as to perform reverse playback on the driving operation (information) 109 stored in the memory 107 by the storage unit 106 when the vehicle 10 moves forward.

In this case, the reverse playback backward movement assistance control unit 111 determines whether the reverse playback backward movement assistance is performed in accordance with the result of the collation obtained by the surrounding situation collation unit 110.

The reverse playback backward movement assistance control unit 111 does not perform the reverse playback backward movement assistance when a moving object is included at the time of collation by the surrounding situation collation unit 110.

In addition, when an object having a high possibility of failure of the sensors 13 and 14 is included at the time of collation by the surrounding situation collation unit 110, the reverse playback backward movement assistance control unit 111 does not perform the reverse playback backward movement assistance and calls the driver's attention. Note that the driver can be alerted through, for example, a display device such as a display, a meter panel, or a warning light provided in a driver's seat, or a notification device such as a sound generating device such as a speaker or a buzzer.

In a case other than the above, the reverse playback backward movement assistance control unit 111 assists the backward travel by reverse playback of the driving operation (information) 109 stored in the memory 107 by the storage unit 106 when the vehicle 10 moves forward.

Figure 5A:
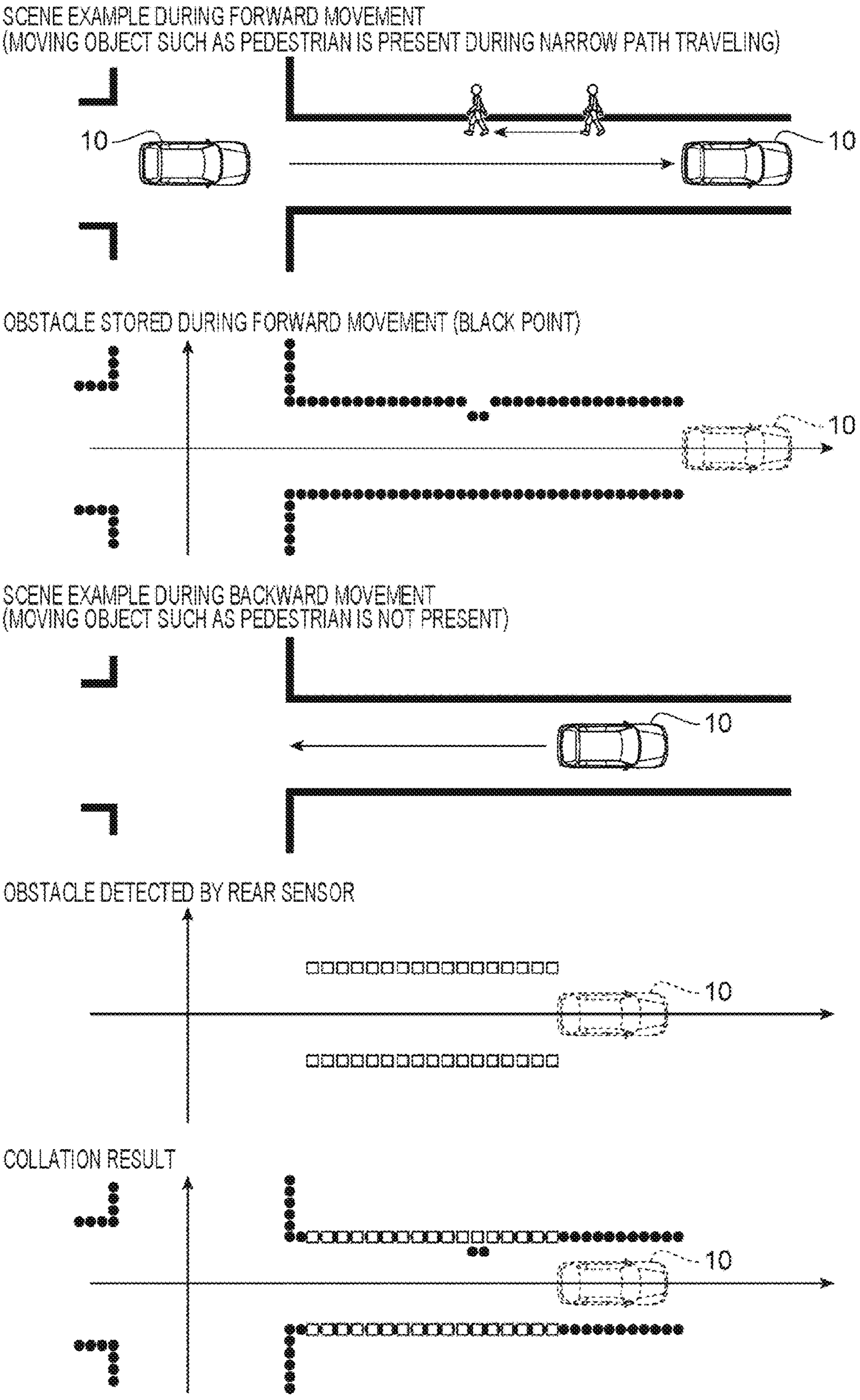
FIG. 5A is an explanatory diagram of an example (when a moving object such as a pedestrian moves) of obstacle determination processing, surrounding situation collation processing, and reverse playback backward movement assistance control according to a known technique (when there is no object type determination).
Figure 5B:
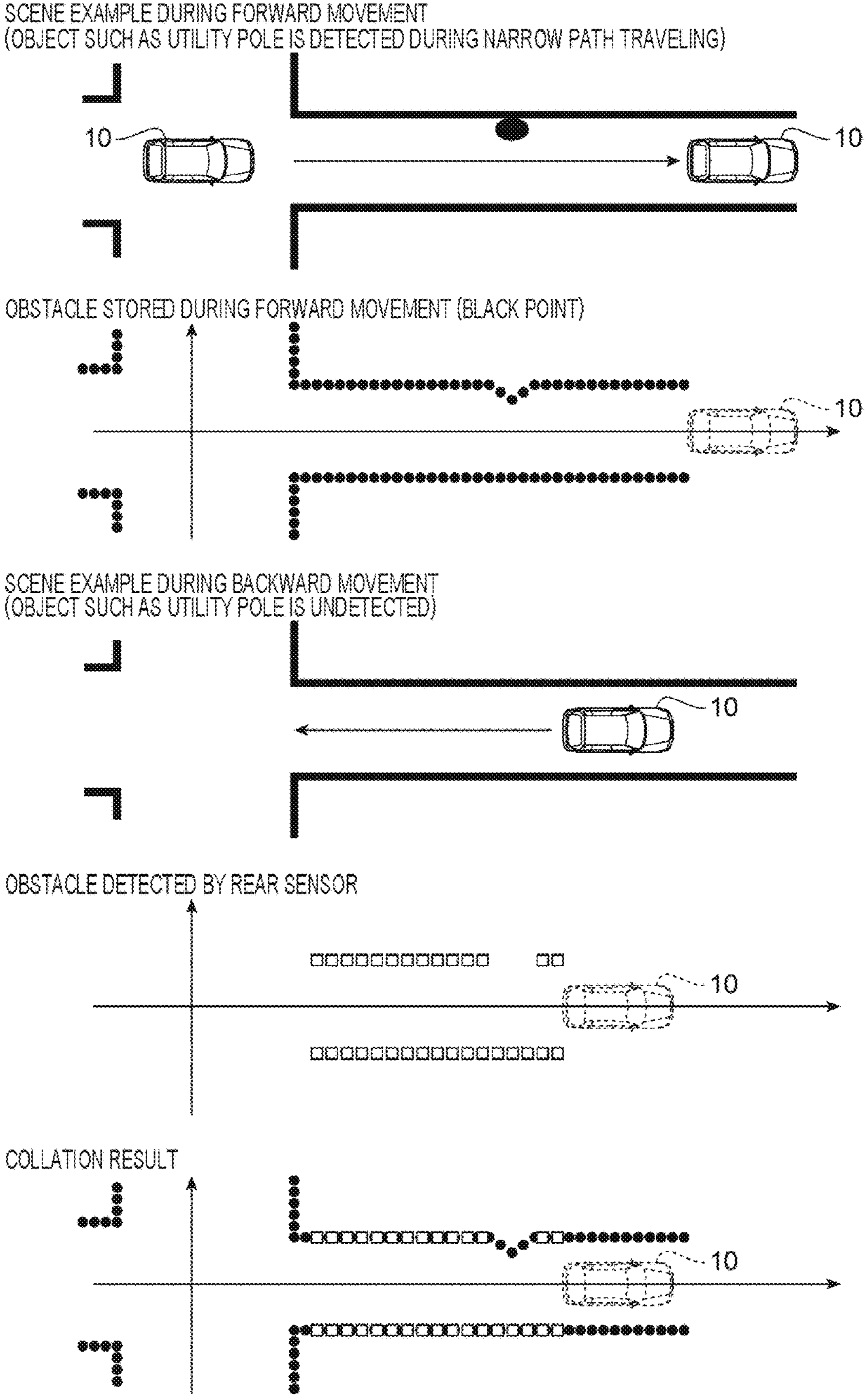
FIG. 5B is an explanatory diagram of another example (when an object such as a utility pole is not detected) of the obstacle determination processing, the surrounding situation collation processing, and the reverse playback backward movement assistance control according to the known technique (when there is no object type determination).

FIG. 5A illustrates an example (when a moving object such as a pedestrian moves) of processing by the known technique (when there is no object type determination), and FIG. 5B illustrates another example (when an object such as a utility pole is not detected) of processing by the known technique (when there is no object type determination). In FIGS. 5A and 5B, both are in the same state (obstacle (a moving object such as a pedestrian in FIG. 5A and an undetected object in FIG. 5B) not currently detected by rear sensor 14 is present on the stored type map), and it is not possible to distinguish whether the map is incorrect (a moving object that happens to exist is stored) or the current rear sensor 14 is incorrect (undetected).

Figure 6A:
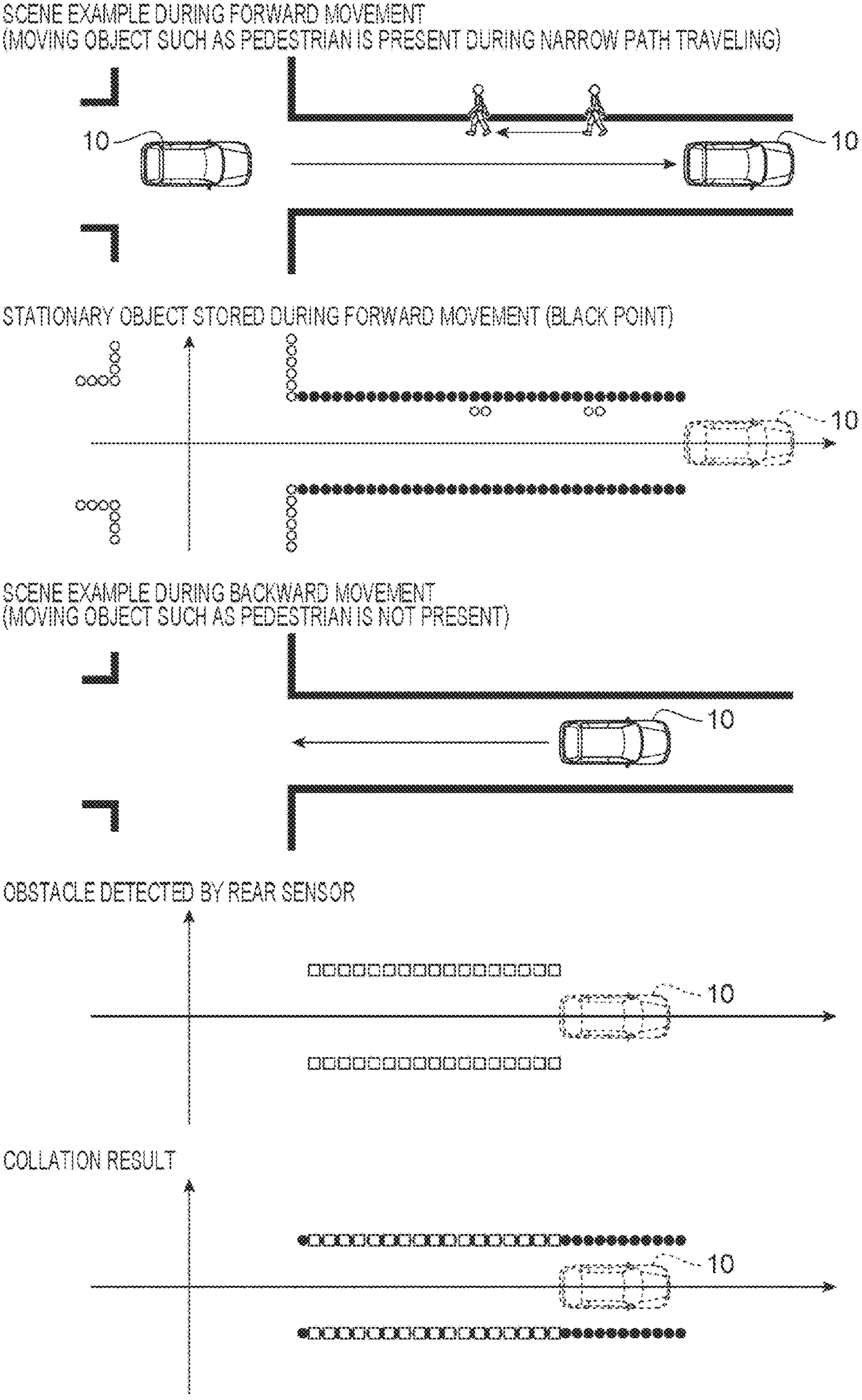
FIG. 6A is an explanatory diagram of an example (when a moving object such as a pedestrian moves) of obstacle determination processing, surrounding situation collation processing, and reverse playback backward movement assistance control according to the present embodiment (when there is object type determination).
Figure 6B:
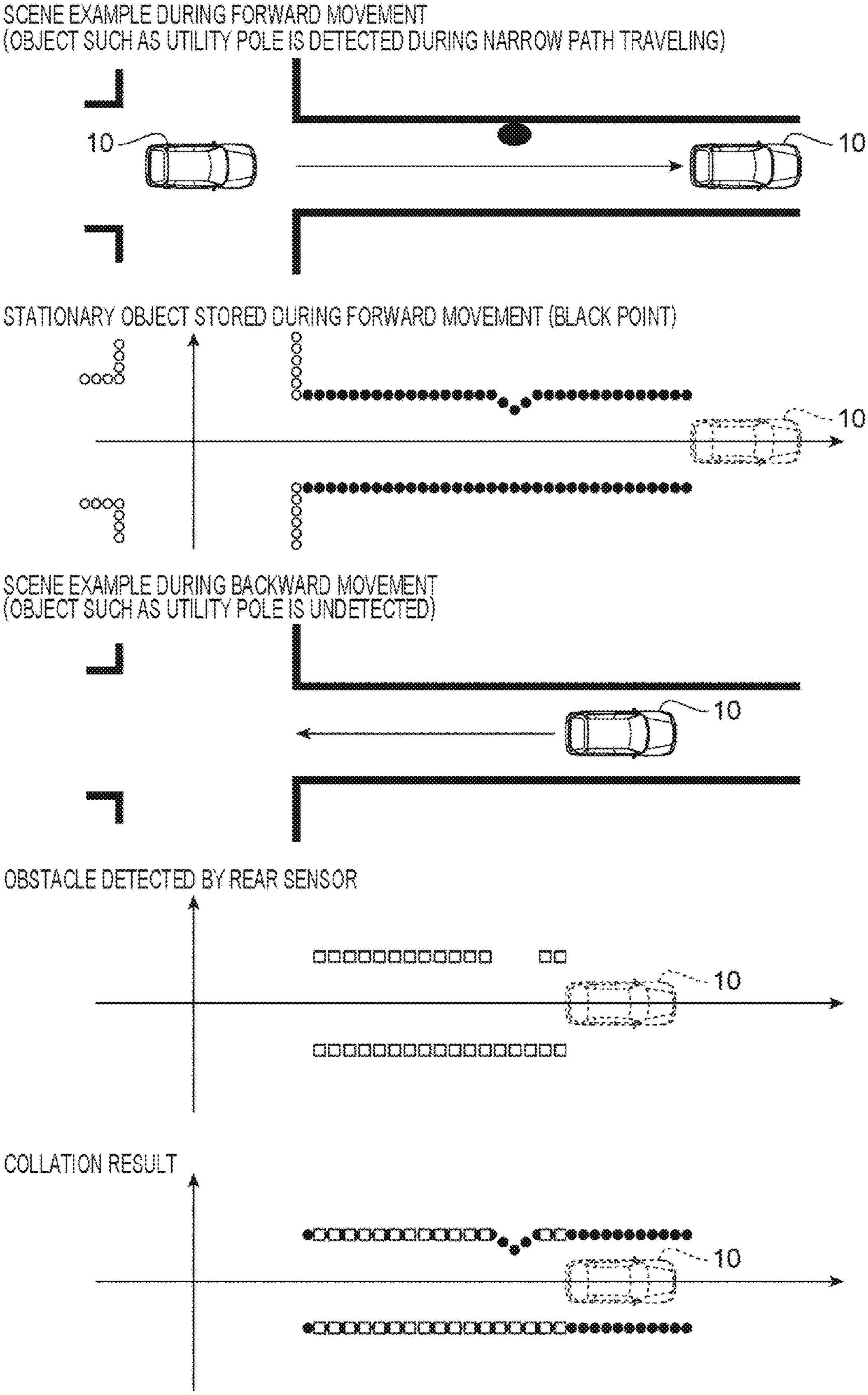
FIG. 6B is an explanatory diagram of another example (when an object such as a utility pole is not detected) of the obstacle determination processing, the surrounding situation collation processing, and the reverse playback backward movement assistance control according to the present embodiment (when there is object type determination).

FIG. 6A illustrates an example (when a moving object such as a pedestrian moves) of processing according to the present embodiment (when there is object type determination), and FIG. 6B illustrates another example (when an object such as a utility pole is not detected) of processing according to the present embodiment (when there is object type determination). Since no moving object is registered in the type map (FIG. 6A), and in a case where no moving object is currently observed by the rear sensor 14 and an obstacle is present on the stored map, it can be determined that the rear sensor 14 is undetected (FIG. 6B). Therefore, it is possible to distinguish whether the map is incorrect (a moving object that happens to be present is stored) or the current rear sensor 14 is incorrect (undetected).

Therefore, based on the determination result, the backward movement assistance control of the reverse playback backward movement assistance control unit 111 can be appropriately performed (backward movement based on storage can be performed).

Figure 7:
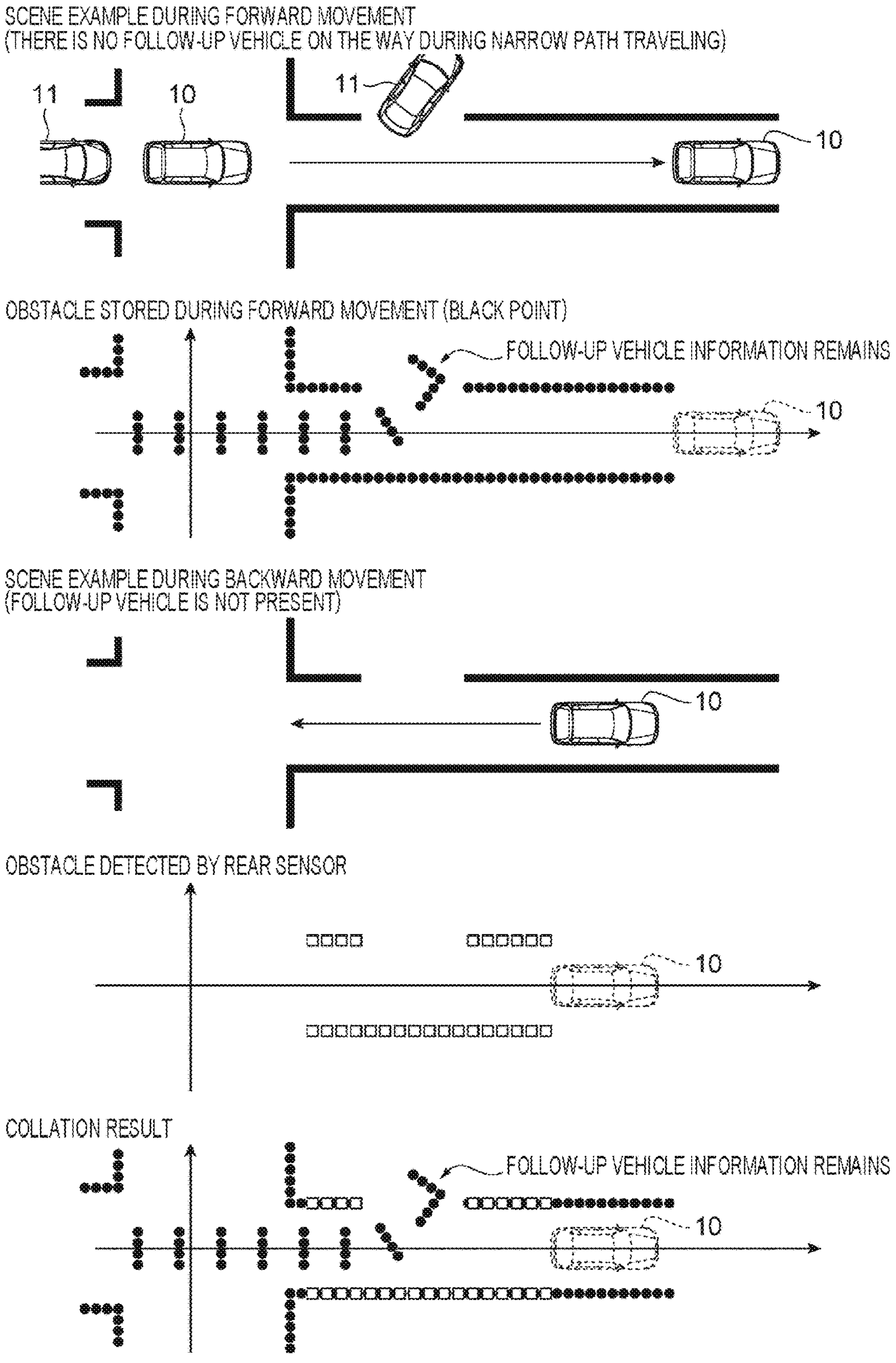
FIG. 7 is an explanatory diagram of still another example (when the follow-up vehicle is not present on the way) of the obstacle determination processing, the surrounding situation collation processing, and the reverse playback backward movement assistance control according to the known technique (when there is no object type determination).
Figure 8:
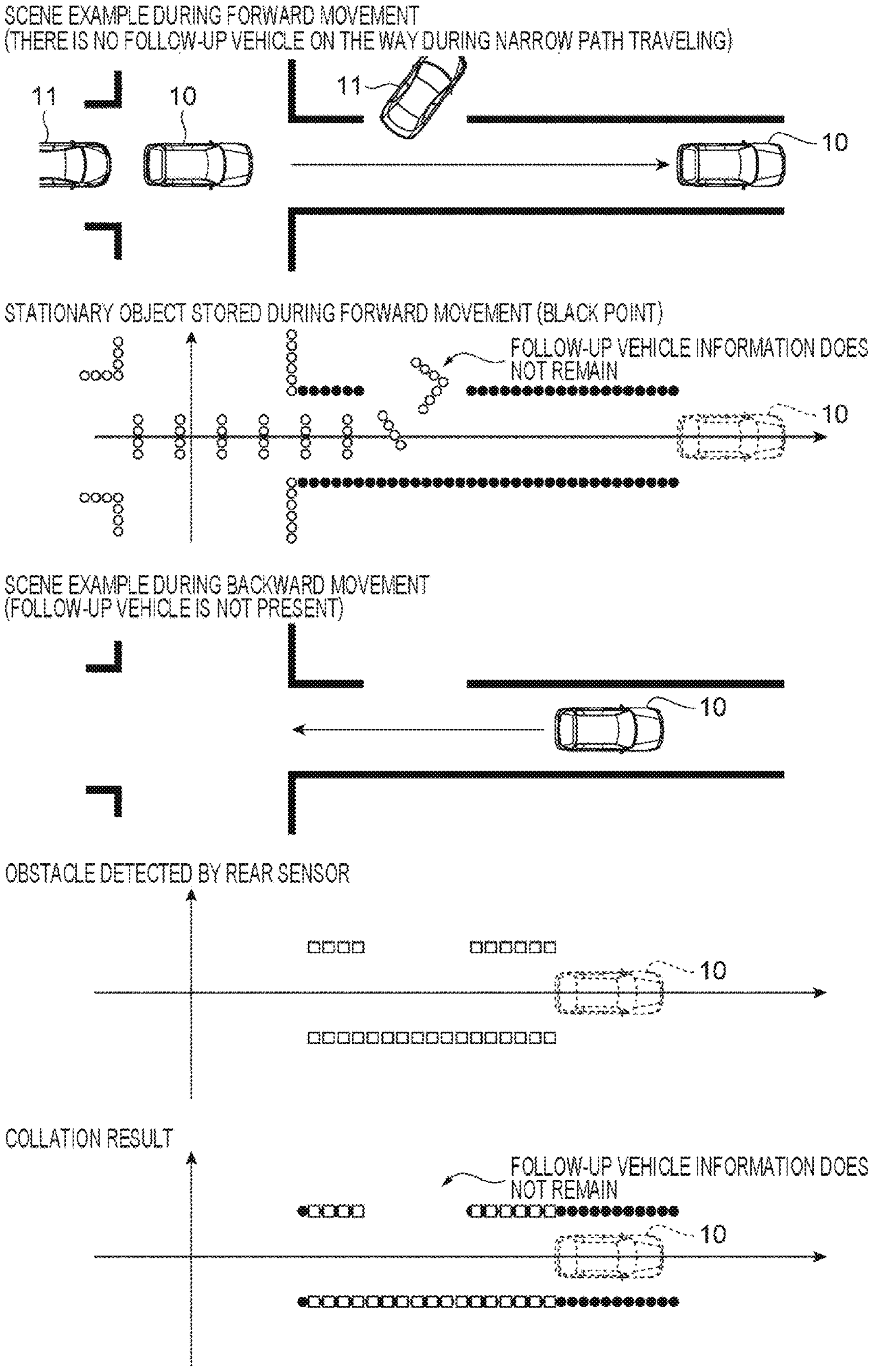
FIG. 8 is an explanatory diagram of still another example (when the follow-up vehicle is not present on the way) of the obstacle determination processing, the surrounding situation collation processing, and the reverse playback backward movement assistance control according to the present embodiment (when there is object type determination).

FIG. 7 illustrates still another example (when there is no follow-up vehicle on the way) of the processing according to the known technique (when there is no object type determination), and FIG. 8 illustrates still another example (when there is no follow-up vehicle on the way) of the processing according to the present embodiment (when there is object type determination).

When the follow-up vehicle 11 is not present on the way, in the known technique, the position of the follow-up vehicle is sequentially recorded and becomes noise. Therefore, collation fails, and backward movement assistance control cannot be performed, resulting in manual operation by the driver (FIG. 7). In the present embodiment, since the information of the follow-up vehicle can be removed and stored, the collation can be performed, and the backward movement assistance control can be performed by reverse playback (FIG. 8).

Figure 9:
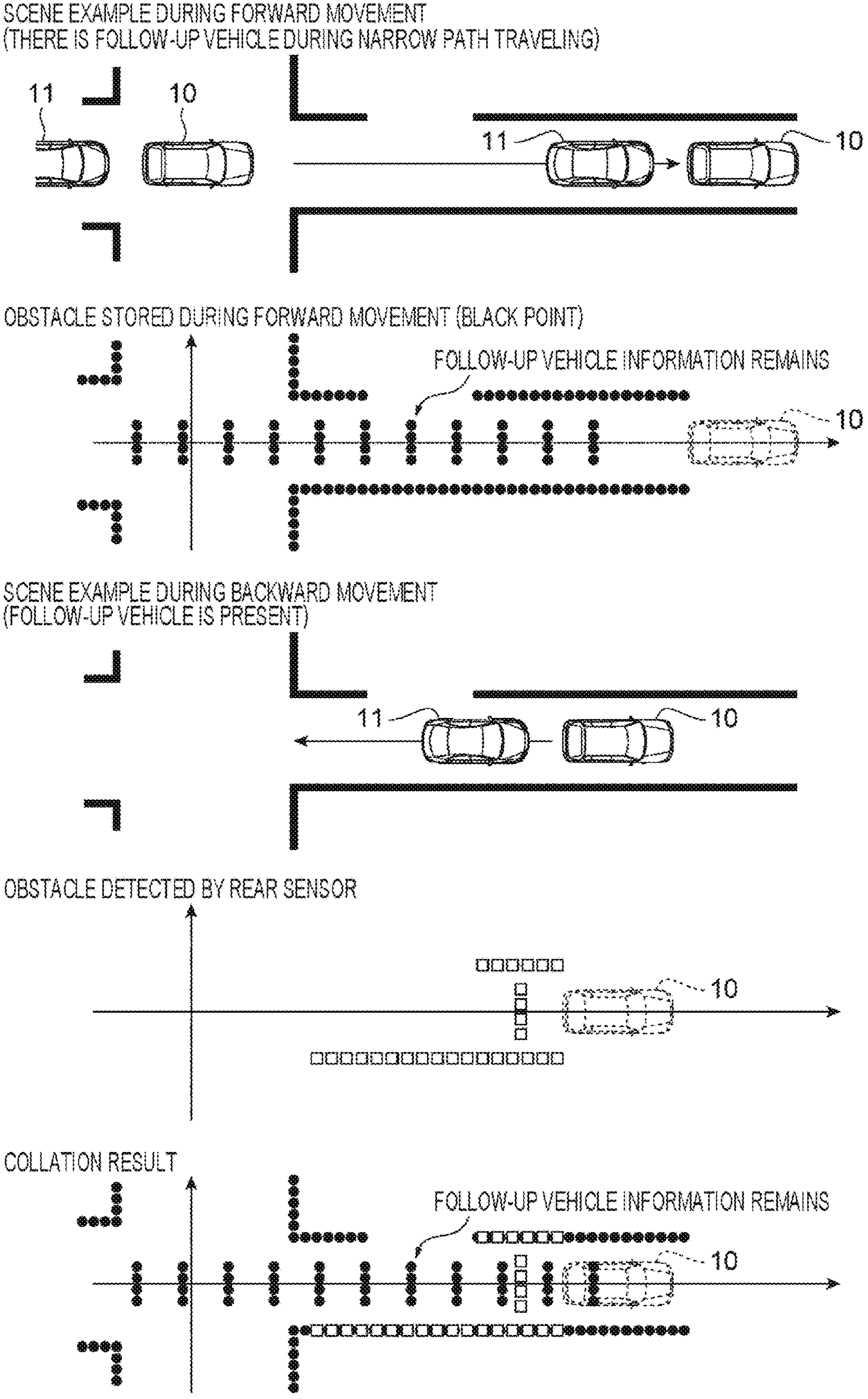
FIG. 9 is an explanatory diagram of still another example (when there is a follow-up vehicle) of the obstacle determination processing, the surrounding situation collation processing, and the reverse playback backward movement assistance control according to the known technique (when there is no object type determination).
Figure 10:
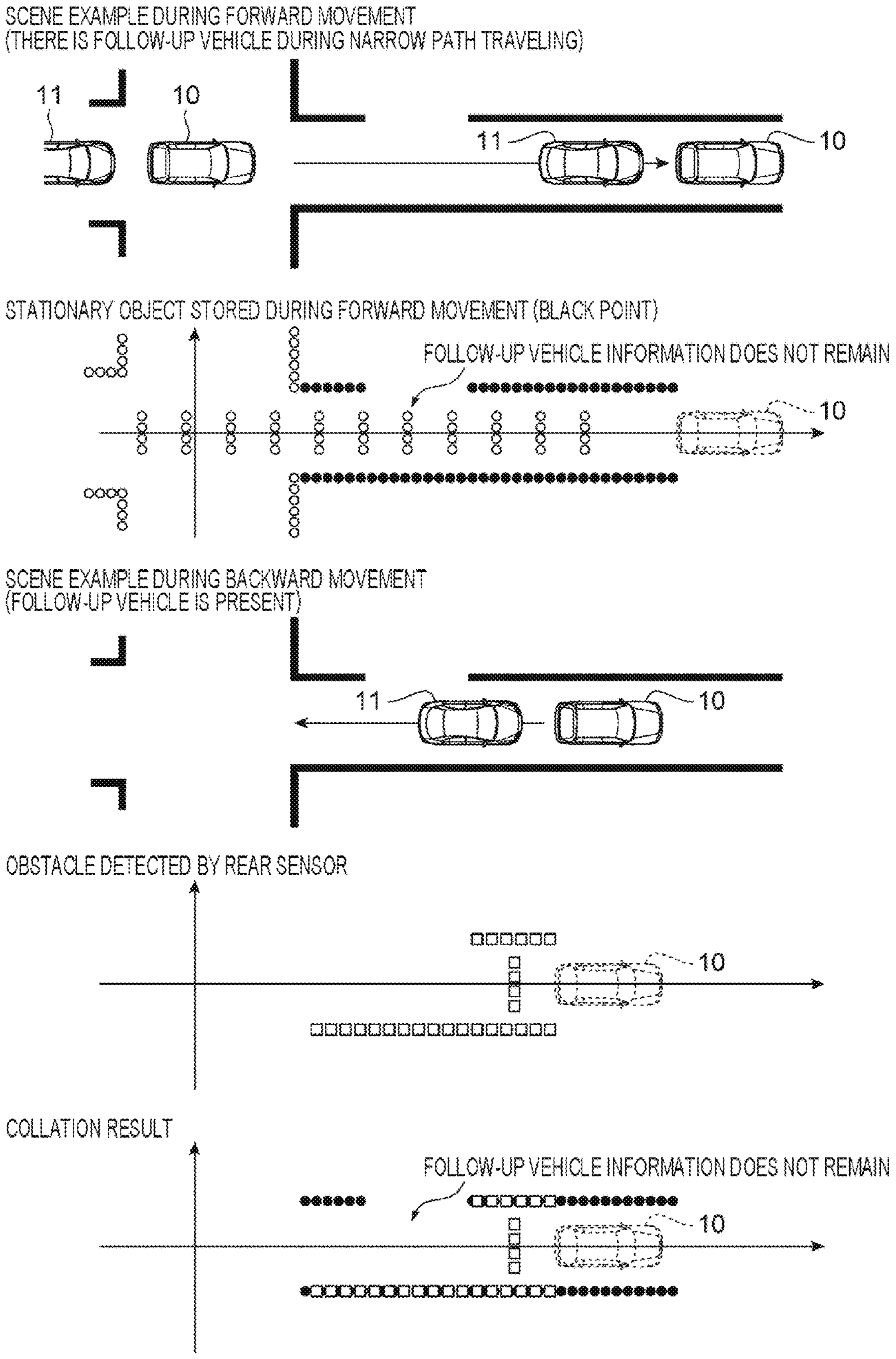
FIG. 10 is an explanatory diagram of still another example (when there is a follow-up vehicle) of the obstacle determination processing, the surrounding situation collation processing, and the reverse playback backward movement assistance control according to the present embodiment (when there is object type determination).

FIG. 9 illustrates still another example (when there is a follow-up vehicle) of the processing according to the known technique (when there is no object type determination), and FIG. 10 illustrates still another example (when there is a follow-up vehicle) of the processing according to the present embodiment (when there is object type determination).

In a case where the follow-up vehicle 11 is present, since the position of the follow-up vehicle is sequentially recorded and becomes noise in the known technique, there is a possibility that collation is performed at an incorrect position (FIG. 9). In the present embodiment, since the information of the follow-up vehicle is excluded and stored, the collation can be performed, and as a result of the collation, the follow-up vehicle can be accurately extracted (FIG. 10).

Follow-Up Vehicle Detection Unit 112

The follow-up vehicle detection unit 112 determines (detects) the presence of the follow-up vehicle from the information of the surrounding situation collation unit 110.

Figure 11:
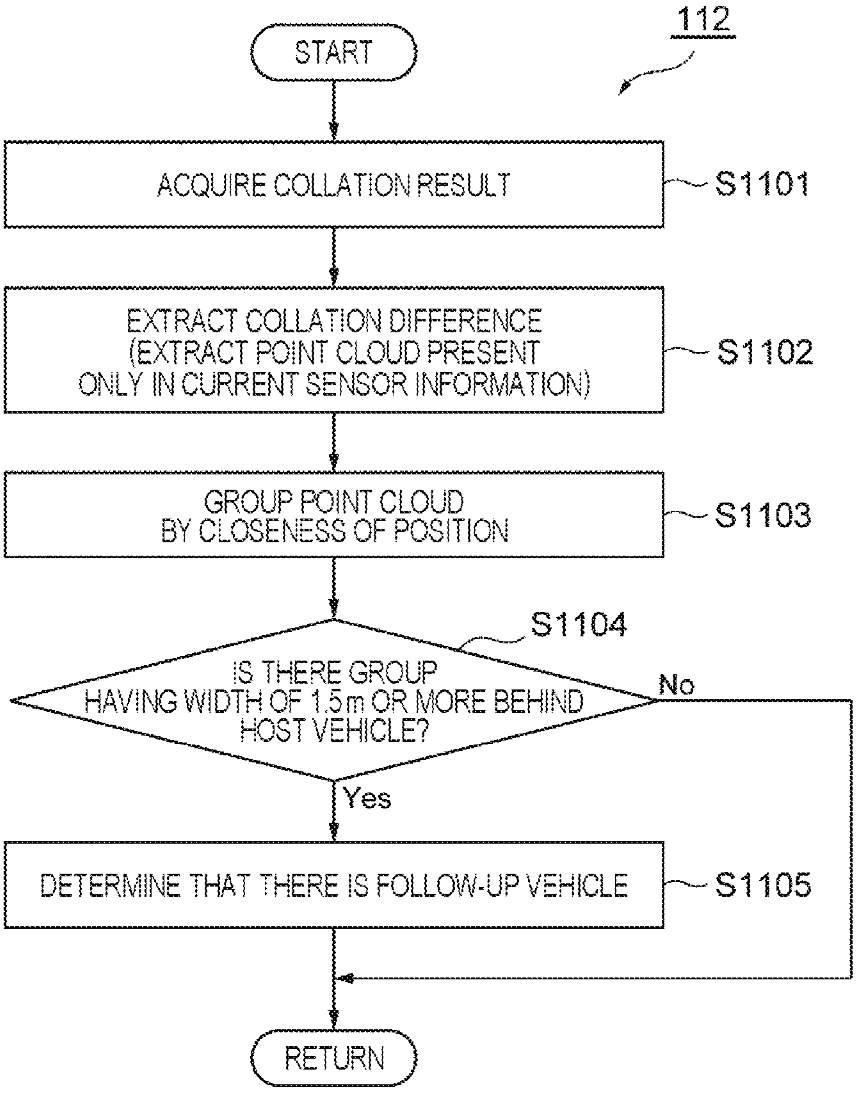
FIG. 11 is a flowchart of a follow-up vehicle detection unit according to the first embodiment of the present invention.

FIG. 11 is a flowchart of the follow-up vehicle detection unit 112 according to the first embodiment of the present invention. The flow illustrated in FIG. 11 is repeatedly performed at a predetermined processing cycle (periodically).

As illustrated in FIG. 11, in S1101, the follow-up vehicle detection unit 112 acquires the collation result from the surrounding situation collation unit 110.

In S1102, a collation difference is extracted from the collation result acquired in S1101. Specifically, a point cloud (obstacle) present only in the current sensor information acquired from the rear sensor information acquisition unit 104 is extracted (see also the collation result in FIG. 10).

In S1103, the point cloud (obstacle) extracted in S1102 is grouped by the closeness of the position. For example, point clouds whose distances are closer than a predetermined position determination criterion can be grouped by regarding them as the same object.

In S1104, the presence or absence of a group having a predetermined width (width 1.5 m) or more behind the host vehicle is determined for the group created in S1103. When there is a group, the process proceeds to S1105, and when there is no group, S1105 is skipped and the processing ends.

In S1105, it is determined that there is a follow-up vehicle behind the host vehicle.

That is, in the collation of the surrounding situation collation unit 110, the follow-up vehicle detection unit 112 determines, as the follow-up vehicle, an object having a predetermined width (width 1.5 m) or more behind the host vehicle among the objects that is not present in the stationary objects of the obstacle (information) 108 stored in the memory 107 by the storage unit 106 and is present in the current sensor information (in other words, the current obstacle information on the rear of the host vehicle obtained by the rear sensor 14) acquired from the rear sensor information acquisition unit 104.

Follow-Up Vehicle Following Control Unit 113

When the follow-up vehicle is detected behind the host vehicle by the follow-up vehicle detection unit 112, the follow-up vehicle following control unit 113 controls a steering device, a driving device, a braking device, a transmission device, and the like to perform follow-up vehicle following control for following the follow-up vehicle. The follow-up vehicle following control can be performed using a known following control method mounted on, for example, an adaptive cruise control or the like that follows a preceding vehicle.

That is, in the collation of the surrounding situation collation unit 110, when there is an object that is not present in the stationary object of the obstacle (information) 108 stored in the memory 107 by the storage unit 106 and is present in the current sensor information (in other words, the current obstacle information on the rear of the host vehicle obtained by the rear sensor 14) acquired from the rear sensor information acquisition unit 104, the surrounding situation collation unit 110 determines that the object is a moving object, and the reverse playback backward movement assistance control unit 111 stops the reverse playback backward movement assistance based on the determination of the surrounding situation collation unit 110. In addition, the follow-up vehicle detection unit 112 determines the presence or absence of the follow-up vehicle behind the host vehicle from the object, and when it is determined that there is the follow-up vehicle behind the host vehicle, the follow-up vehicle following control unit 113 performs the follow-up vehicle following control based on the determination of the follow-up vehicle detection unit 112.

Passing Space Determination Unit 114

As a result of the collation by the surrounding situation collation unit 110, the passing space determination unit 114 detects (determines) a passing space on the rear side of the vehicle 10 where the vehicle 10 can pass each other.

Figure 12:
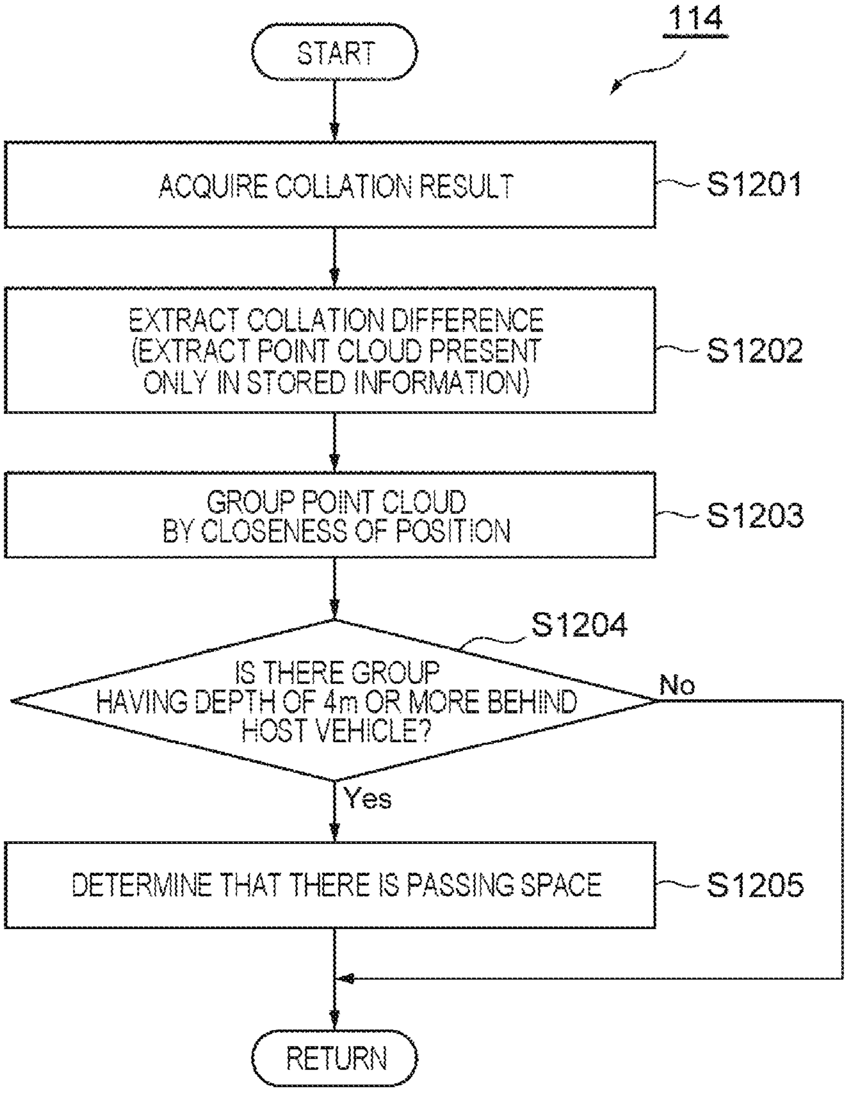
FIG. 12 is a flowchart of a passing space determination unit according to the first embodiment of the present invention.

FIG. 12 is a flowchart of the passing space determination unit 114 according to the first embodiment of the present invention. The flow illustrated in FIG. 12 is repeatedly performed at a predetermined processing cycle (periodically).

As illustrated in FIG. 12, the passing space determination unit 114 acquires the collation result from the surrounding situation collation unit 110 in S1201.

In S1202, a collation difference is extracted from the collation result acquired in S1201. Specifically, the storage unit 106 extracts a point cloud (obstacle) present only in the stored information (that is, a stationary object of the obstacle (information) 108) stored in the memory 107. Note that stored information outside the detection range of the current sensor used for collation is excluded.

In S1203, the point cloud (obstacle) extracted in S1202 is grouped by the closeness of the position. For example, point clouds whose distances are closer than a predetermined position determination criterion can be grouped by regarding them as the same object.

In S1204, the presence or absence of a group having a predetermined depth (depth 4 m) or more behind the host vehicle is determined for the group created in S1203. When there is a group, the process proceeds to S1205, and when there is no group, S1205 is skipped and the processing ends.

In S1205, it is determined that there is the passing space behind the host vehicle.

That is, in the collation of the surrounding situation collation unit 110, the passing space determination unit 114 determines, as the passing space, a space in which an object having a predetermined depth (depth 4 m) or more behind the host vehicle is present among objects that is present in the stationary objects of the obstacle (information) 108 stored in the memory 107 by the storage unit 106 and is not present in the current sensor information (in other words, the current obstacle information on the rear of the host vehicle obtained by the rear sensor 14) acquired from the rear sensor information acquisition unit 104.

Rear Side Movement Assistance Control Unit 115

When the passing space is detected (determined) to the rear side of the host vehicle by the passing space determination unit 114, the rear side movement assistance control unit 115 controls the steering device, the driving device, the braking device, the transmission device, and the like to perform rear side movement assistance control of moving to the passing space on the rear side of the host vehicle to assist the passing. Note that the rear side movement assistance control can be performed, for example, using a known route generation/movement assistance control method mounted in a system that automatically performs tandem stop.

That is, in the collation of the surrounding situation collation unit 110, when there is an object that is present in the stationary object of the obstacle (information) 108 stored in the memory 107 by the storage unit 106 and is not present in the current sensor information (in other words, the current obstacle information on the rear of the host vehicle obtained by the rear sensor 14) acquired from the rear sensor information acquisition unit 104, the surrounding situation collation unit 110 determines that there is a high possibility of the failure of the sensors 13 and 14, and the reverse playback backward movement assistance control unit 111 stops the reverse playback backward movement assistance based on the determination of the surrounding situation collation unit 110. In addition, the passing space determination unit 114 determines the presence or absence of the passing space on the rear side of the host vehicle from the object, and when it is determined that there is the passing space behind the host vehicle, the rear side movement assistance control unit 115 performs the rear side movement assistance control based on the determination of the passing space determination unit 114.

Operation and Effect

According to the present embodiment, since moving objects such as a stopped vehicle and a pedestrian are distinguished and stored, it is possible to recognize that a moving object such as a stopped vehicle and a pedestrian present at the time of forward movement has moved and lost at the time of backward movement. Similarly, in a case where an area stored as an obstacle that does not move (stationary object) cannot be currently detected, it is possible to recognize that the area cannot be detected due to a failure of a sensor or the like at the time of backward movement.

Furthermore, even in a case where a follow-up vehicle is present at the time of forward movement, the follow-up vehicle and surrounding obstacles are stored in a distinguished manner. Therefore, for example, even in a case where there is no follow-up vehicle on the way, comparison at the time of backward movement can be correctly performed.

Therefore, it is possible to provide the driving assistance device 100 that is safe and convenient in a situation where reverse playback cannot be performed in passing on a narrow path or the like.

Second Embodiment

Next, a driving assistance device according to a second embodiment of the present invention will be described with reference to FIGS. 13 to 18. The second embodiment is different from the first embodiment in an object type determination method. In the first embodiment, the observation information (sensor information including point cloud data) of the front sensor 13 and the rear sensor 14 is integrated to determine and store the object type. In the second embodiment, the object type is determined and stored from the observation information of the sensor in which the object type can be determined by the image.

System Configuration of Driving Assistance Device

Figure 13:
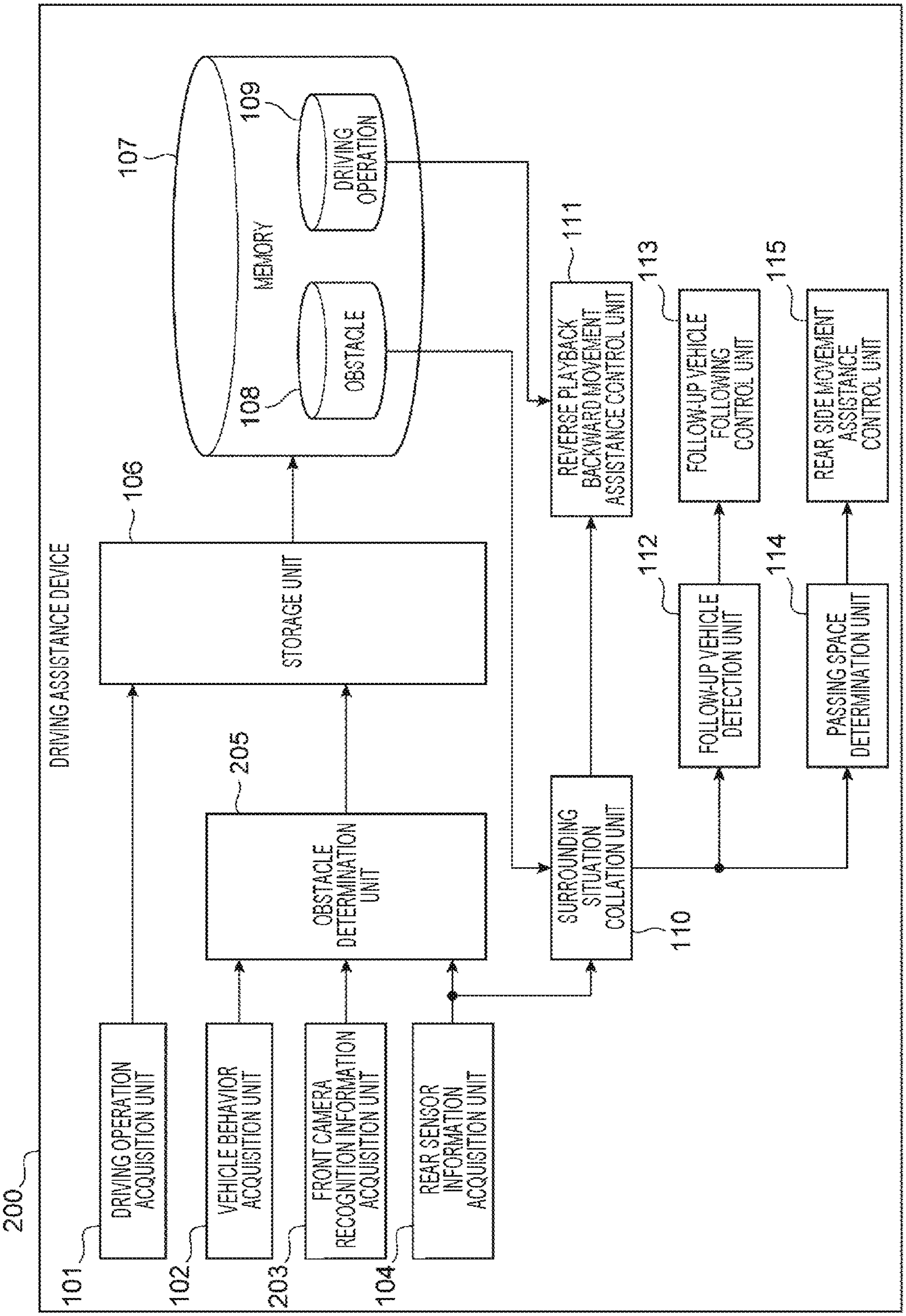
FIG. 13 is a system configuration diagram of a driving assistance device according to a second embodiment of the present invention.

FIG. 13 is a system configuration diagram of a driving assistance device 200 according to a second embodiment of the present invention.

The driving assistance device 200 is a computer that controls the vehicle 10, and executes a program stored in a storage medium to function as a driving operation acquisition unit 101, a vehicle behavior acquisition unit 102, a front camera recognition information acquisition unit 203, a rear sensor information acquisition unit 104, an obstacle determination unit 205, a storage unit 106, a surrounding situation collation unit 110, a reverse playback backward movement assistance control unit 111, a follow-up vehicle detection unit 112, a follow-up vehicle following control unit 113, a passing space determination unit 114, and a rear side movement assistance control unit 115.

That is, the driving assistance device 200 of the second embodiment includes the front camera recognition information acquisition unit 203 and the obstacle determination unit 205 instead of the front sensor information acquisition unit 103 and the obstacle determination unit 105 of the driving assistance device 100 of the first embodiment.

Front Camera Recognition Information Acquisition Unit 203

The driving assistance device 200 is connected to the front camera 23 (FIGS. 14A to 14D) mounted on the vehicle 10. The front camera 23 has a function as a front observation unit that observes a surrounding situation in front of the vehicle (host vehicle) 10. The front camera 23 includes a sensor capable of determining the object type based on the image. The front camera 23 outputs image data including information obtained by determining (recognizing) an object type of a surrounding object (obstacle) appearing in the image to the driving assistance device 100.

Examples of the object type that can be determined by the front camera 23 include pedestrians, bicycles, two-wheeled vehicles (motorcycles), vehicles (including stopped vehicles), moving objects that may move such as fences, signboards, poles, and pylons installed for construction, and stationary objects such as signs as features, guard rails, walls, fences, signboards, poles, pylons, curbs, and vehicle stops.

The front camera recognition information acquisition unit 203 acquires observation information (sensor information having image data in which an obstacle in front of the vehicle 10 is detected) of the front of the vehicle 10 from the front camera 23.

Configuration of Sensors 23 and 14

Figure 14A:
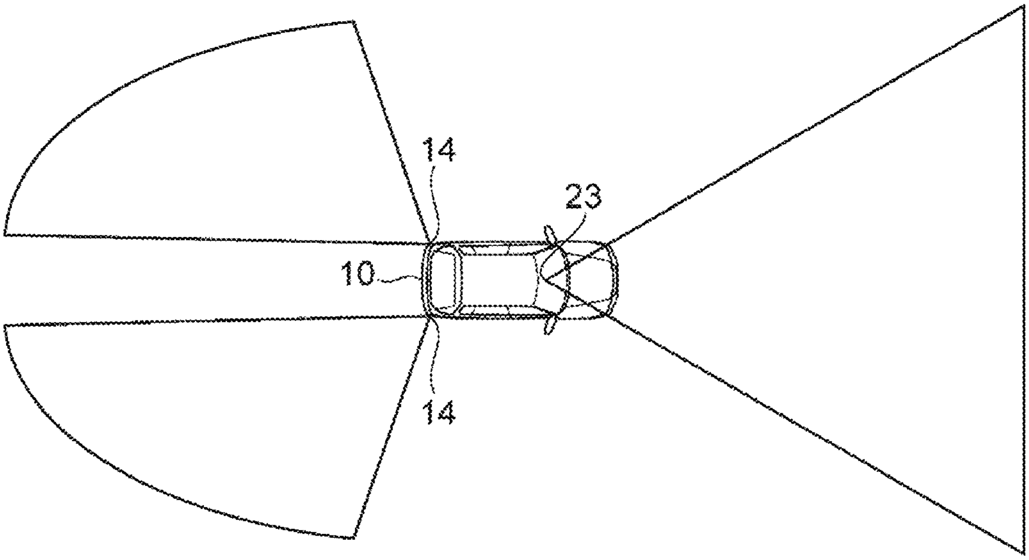
FIG. 14A is an overhead view illustrating an example (an example in which a front camera is attached to a front center and rear sensors for rear side are attached to rear left and right) of a sensor attachment configuration and a sensor detection range according to the second embodiment of the present invention.
Figure 14B:
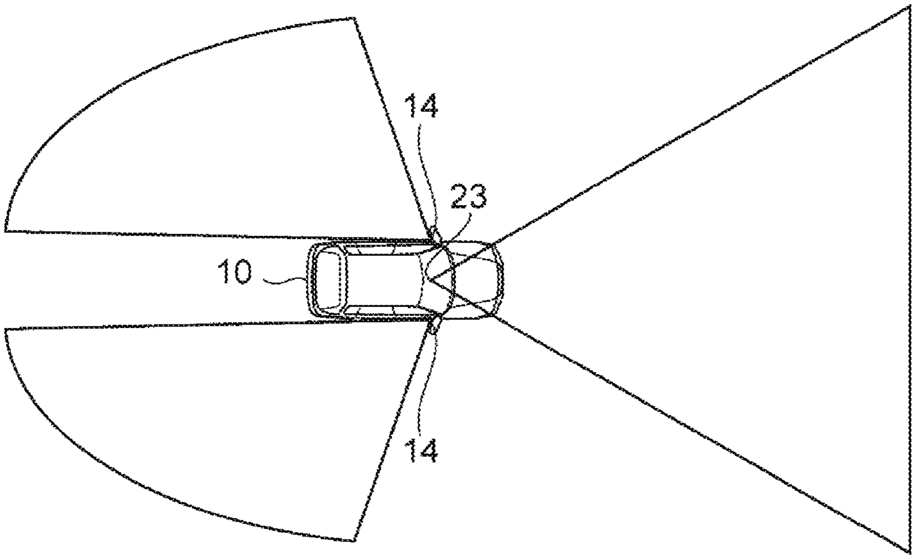
FIG. 14B is an overhead view illustrating another example (an example in which the front camera is attached to the front center and the rear sensors for rear side are attached to left and right side mirrors) of the sensor attachment configuration and the sensor detection range according to the second embodiment of the present invention.
Figure 14C:
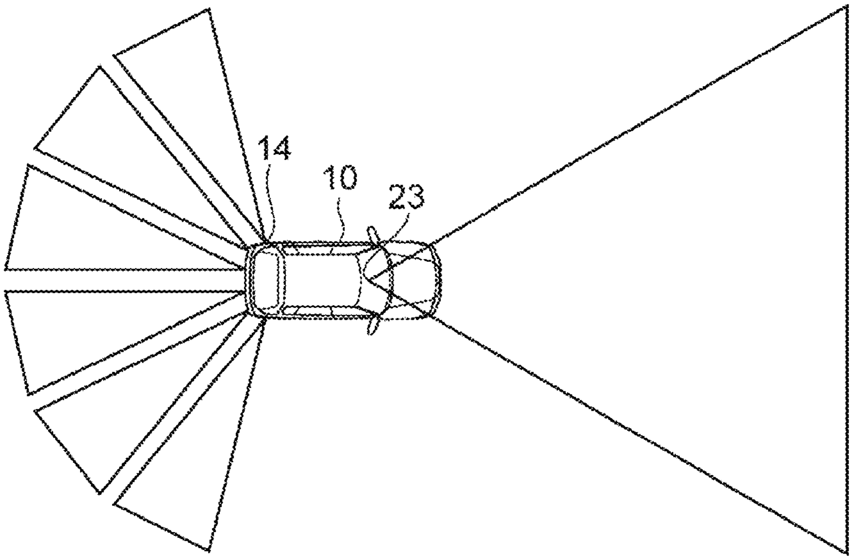
FIG. 14C is an overhead view illustrating another example (an example in which the front camera is attached to the front center and the rear sensor is attached to a bumper at rear of the vehicle) of the sensor attachment configuration and the sensor detection range according to the first embodiment of the present invention.
Figure 14D:
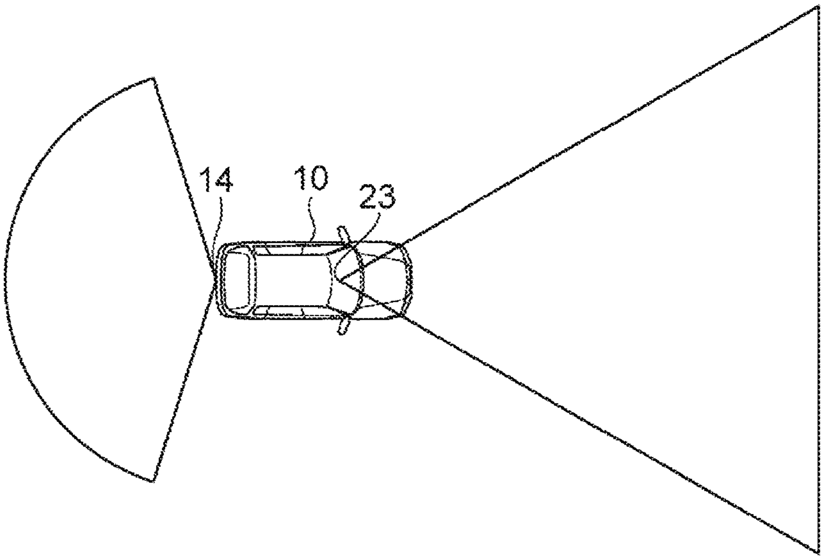
FIG. 14D is an overhead view illustrating another example (an example in which the front camera is attached to the front center and the rear sensor is attached to rear of the vehicle) of the sensor attachment configuration and the sensor detection range according to the first embodiment of the present invention.

FIGS. 14A, B, C, and D illustrate mounting examples of the sensors 23 and 14 according to the second embodiment of the present invention. As described above, in the present embodiment, the front camera 23 and the rear sensor 14 are attached to the vehicle 10 so as to observe different directions in the surrounding situation of the vehicle 10. The front camera 23 and rear sensor 14 are configured using sensors having different characteristics.

As an example, as illustrated in FIGS. 14A to 14D, the front camera 23 is attached to the front center (for example, the center portion inside the windshield in the vehicle interior) of the vehicle 10 so as to face the front of the vehicle 10. The attachment modes (FIGS. 14A to 14D) of the rear sensor 14 are basically the same as those in the first embodiment. Note that the number, arrangement, and the like of the front camera 23 and the rear sensor 14 are not limited to the examples of FIGS. 14A to 14D.

Obstacle Determination Unit 205

The obstacle determination unit 205 determines the object type of the obstacle (in front and rear of) around the vehicle 10 using the sensor information acquired from the front camera recognition information acquisition unit 203 and the rear sensor information acquisition unit 104. The obstacle determination unit 205 determines at least a stationary object and other objects (moving objects and the like) as the object type.

In the present embodiment, the obstacle determination unit 205 determines at least a stationary object from the sensor information (in other words, the detection result of the rear sensor 14) acquired from the rear sensor information acquisition unit 104 based on the object type information (the object type information determined by the front camera 23) of the sensor information acquired from the front camera recognition information acquisition unit 203.

Figure 15:
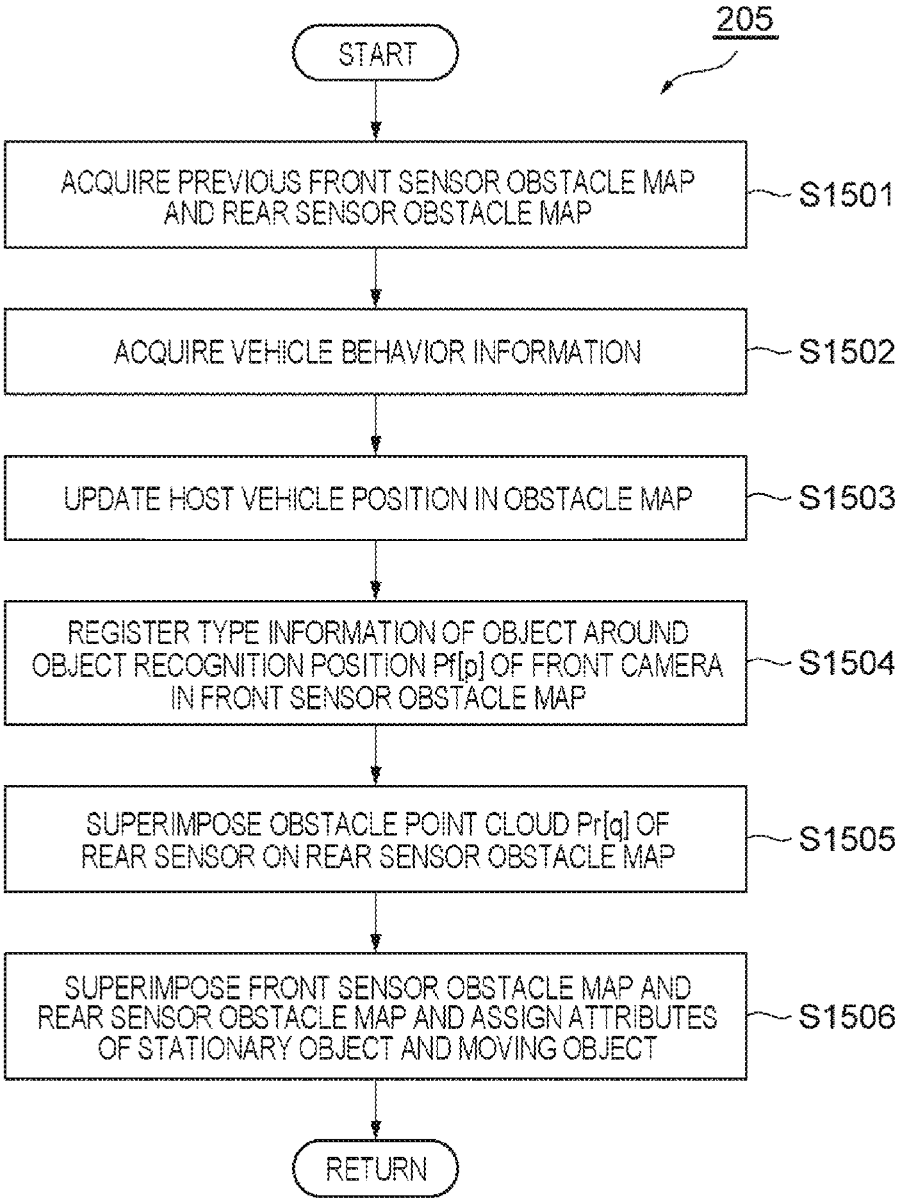
FIG. 15 is a flowchart of an obstacle determination unit according to the second embodiment of the present invention.
Figures 16, 16A, 16B, 16C, 16D, 16E, 16F, 16G, 16H, 16I:
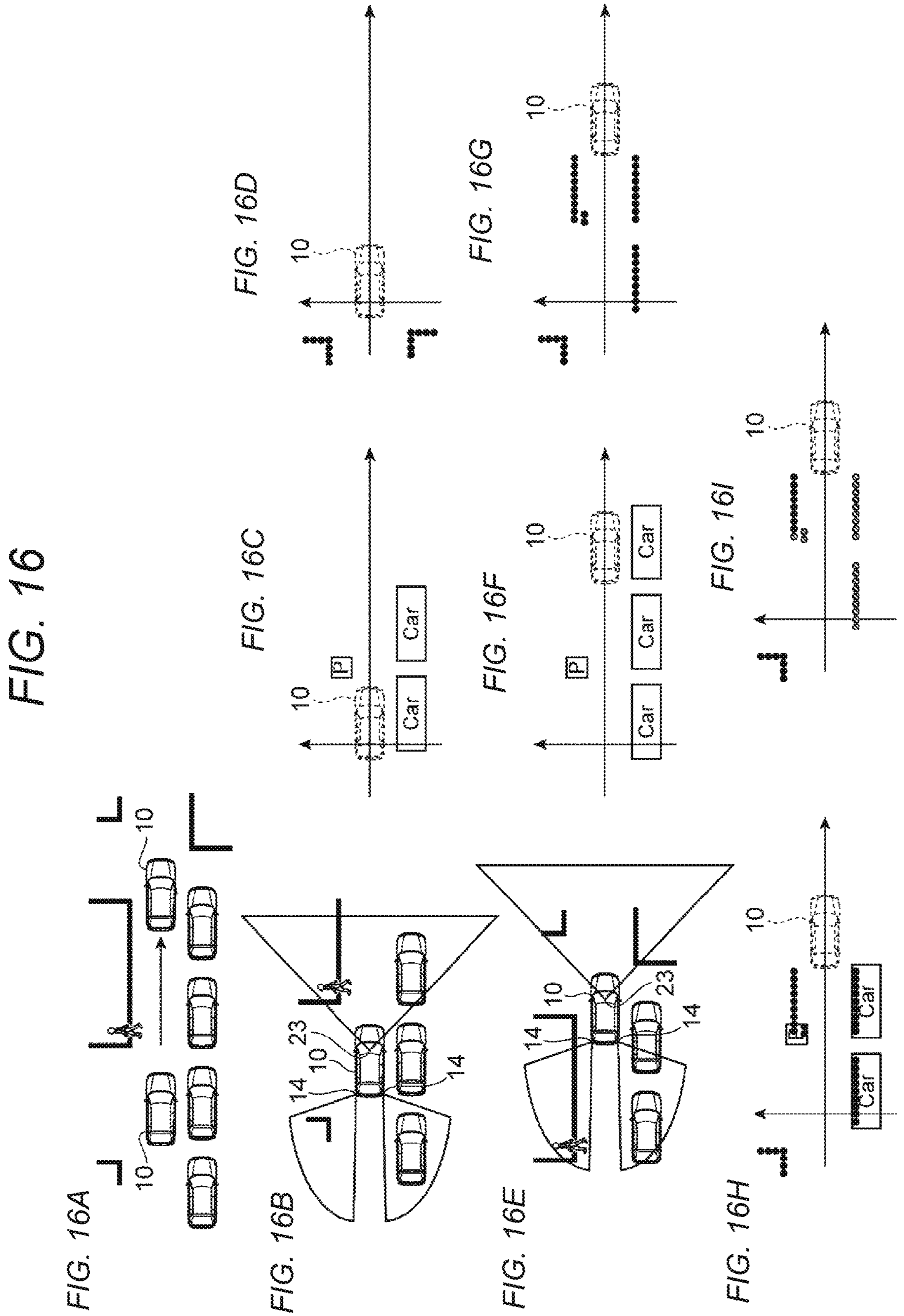
FIGS. 16A through 16I illustrate an example of obstacle determination processing performed by the obstacle determination unit according to the second embodiment of the present invention.

FIG. 15 is a flowchart of the obstacle determination unit 205 according to the second embodiment of the present invention. The flow illustrated in FIG. 15 is repeatedly performed at a predetermined processing cycle (periodically). FIG. 16 illustrates an example of obstacle determination processing by the obstacle determination unit 205 according to the second embodiment of the present invention.

FIG. 16A illustrates a scene in which the vehicle 10 travels from left to right on a narrow path, a pedestrian is present on the left side of the vehicle 10, and a plurality of tandem stopped vehicles is present on the right side of the vehicle 10. FIG. 16B illustrates detection situations of the sensors 23 and 14 at a position (time t−Δt) on the left side of FIG. 16A, and FIGS. 16C and 16D illustrate a front sensor obstacle map and a rear sensor obstacle map created at a position (time t−Δt) on the left side of FIG. 16A. FIG. 16E illustrates detection situations of the sensors 23 and 14 at a position (time t) on the right side of FIG. 16A, and FIGS. 16F and 16G illustrate a front sensor obstacle map and a rear sensor obstacle map created at a position (time t) on the right side of FIG. 16A. FIGS. 16H and 16I illustrate type maps created by comparing (superimposing) the front sensor obstacle map of FIG. 16F with the rear sensor obstacle map of FIG. 16G. In the type map of FIG. 16I, a hatching point indicates a point cloud determined as a moving object having a possibility of moving, and a black point indicates a point cloud determined as a stationary object.

The obstacle determination unit 205 arranges the sensor information (image information and point cloud information in which obstacles in front and rear of vehicle 10 are detected) acquired from the front camera recognition information acquisition unit 203 and the rear sensor information acquisition unit 104 in a map stored in advance in the memory, thereby creating (updating) the front sensor obstacle map and the rear sensor obstacle map, and storing the created maps in the memory (FIGS. 16B, 16C, and 16D).

As illustrated in FIG. 15, in S1501, the obstacle determination unit 205 acquires the previous (time t−Δt, Δt: processing cycle) front sensor obstacle map and the previous rear sensor obstacle map stored in the memory as described above (FIGS. 16C and 16D).

In S1502, the vehicle behavior information is acquired from the vehicle behavior acquisition unit 102.

In S1503, the host vehicle position in the front sensor obstacle map and the rear sensor obstacle map is updated using the front sensor obstacle map and the rear sensor obstacle map acquired in S1501 and the vehicle behavior information acquired in S1502 (FIGS. 16F and 16G).

In S1504, the (current (time t)) sensor information (type information of the object around the object recognition position Pf[p] of the front camera 23) acquired from the front camera recognition information acquisition unit 203 is registered in the (previous (time t−Δt)) front sensor obstacle map acquired in S1501 (FIG. 16F). In other words, the type information of the object is registered at the position corresponding to the periphery of the object recognition position Pf[p] of the front camera 23 in the (previous time t−Δt) front sensor obstacle map acquired in S1501.

In S1505, the obstacle point cloud Pr[q] of the rear sensor 14, which is the (current (time t)) sensor information (the point cloud information indicating that the obstacle behind the vehicle 10 has been detected) acquired from the rear sensor information acquisition unit 104, is superimposed on the (previous time (time t−Δt)) rear sensor obstacle map acquired in S1501 (FIG. 16G).

In S1506, the (current (time t)) front sensor obstacle map created in S1504 and the (current (time t)) rear sensor obstacle map created in S1505 are superimposed (FIG. 16H), and attributes of a stationary object and a moving object are assigned (FIG. 16I).

That is, the obstacle determination unit 205 determines at least a stationary object from the detection result (point cloud) of the rear sensor 14 based on the object type information determined by the front camera 23.

As a result, the obstacle determination unit 205 determines at least a stationary object and the other obstacles (moving object or the like) among the obstacles around the host vehicle 10.

Figure 17:
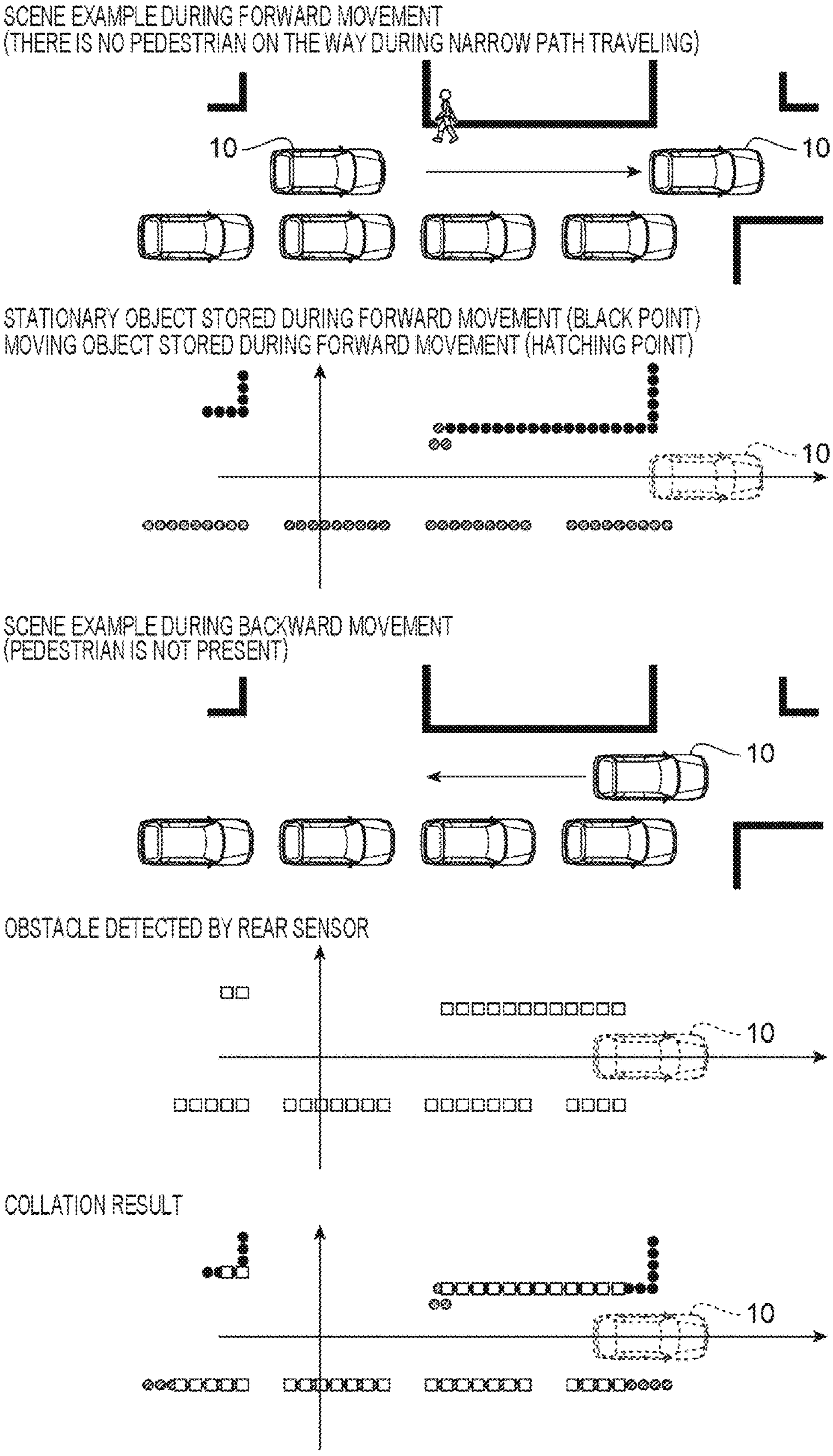
FIG. 17 is an explanatory diagram of an example (when there is a pedestrian on the left side of the host vehicle, there is a tandem stopped vehicle on the right side of the host vehicle, and there is no pedestrian on the way) of the obstacle determination processing, surrounding situation collation processing, and reverse playback backward movement assistance control according to the present embodiment.

FIG. 17 is an example of processing according to the present embodiment, and illustrates a case where there is a pedestrian on the left side of the host vehicle, there is a tandem stopped vehicle on the right side of the host vehicle, and there is no pedestrian on the way (at the time of the backward movement assistance control).

Since the pedestrian who disappears on the way is registered with the attribute of the moving object in the type map, it can be determined that there is a possibility of moving at the time of the backward movement assistance control.

Therefore, based on the determination result, the backward movement assistance control of the reverse playback backward movement assistance control unit 111 can be appropriately performed (backward movement based on storage can be performed).

Figure 18:
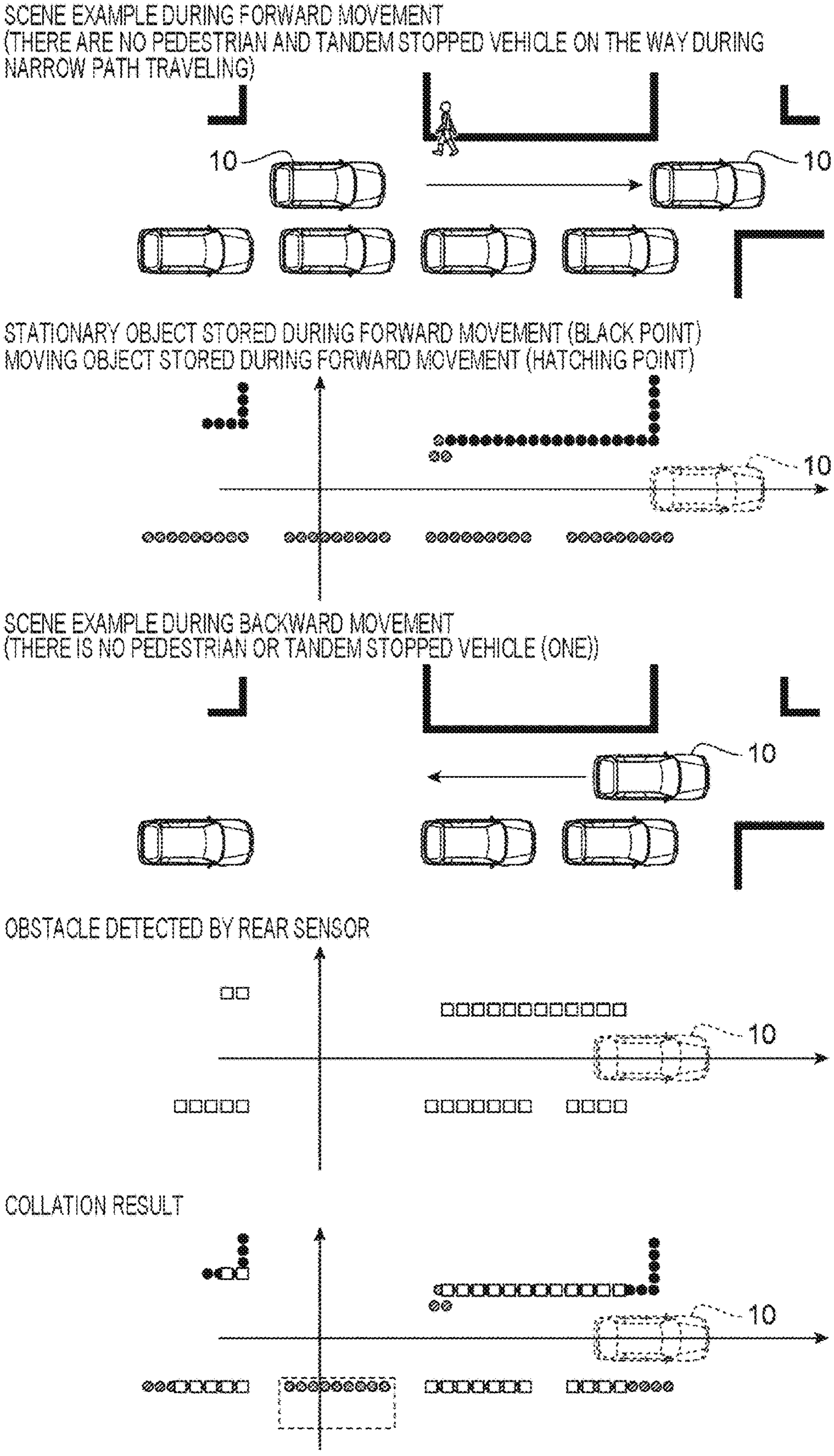
FIG. 18 is an explanatory diagram of another example (when there is a pedestrian on the left side of the host vehicle, there is a tandem stopped vehicle on the right side of the host vehicle, and there is no pedestrian or tandem stopped vehicle (one) on the way and a passing space is generated between the tandem stopped vehicles) of the obstacle determination processing, the surrounding situation collation processing, and the reverse playback backward movement assistance control according to the present embodiment.

FIG. 18 is another example of the processing according to the present embodiment, and illustrates a case where there is a pedestrian on the left side of the host vehicle, there is a tandem stopped vehicle on the right side of the host vehicle, and there is no pedestrian or tandem stopped vehicle (one) on the way (during the backward movement assistance control), and a passing space is generated between the tandem stopped vehicles.

Since the pedestrian and the tandem stopped vehicle that disappear on the way are registered with the attribute of the moving object added to the type map, it can be determined that there is a possibility of moving at the time of the backward movement assistance control.

Therefore, based on the determination result, the backward movement assistance control of the reverse playback backward movement assistance control unit 111 or the movement assistance control of the rear side movement assistance control unit 115 can be appropriately performed.

Note that, in the examples illustrated in FIGS. 16 to 18, the case has been exemplified where the obstacle determination unit 205 determines (detects) the right and left pedestrians and the stopped vehicles of the host vehicle 10 and stores the same in the memory 107. However, it is also possible to perform similar control (backward movement assistance control of reverse playback backward movement assistance control unit 111, or movement assistance control by rear side movement assistance control unit 115) by determining (detecting) a construction area or a construction site from a construction fence, a signboard, a pole, a pylon, or the like around the host vehicle 10 and storing the same in the memory 107.

Operation and Effect

According to the present embodiment, in addition to the operational effects similar to those of the first embodiment, by the determination of the object type by the image, even when the object that is likely to move is stationary, the object can be determined as the moving object, and the detection (recognition) accuracy of the surrounding object is improved, so that the comparison at the time of backward movement can be correctly performed.

Therefore, it is possible to provide the driving assistance device 200 that is safe and convenient in a situation where the reverse playback cannot be performed in passing on a narrow path or the like.

Third Embodiment

Next, a driving assistance device according to a third embodiment of the present invention will be described with reference to FIGS. 19 to 21. The third embodiment is different from the first and second embodiments in the backward movement assistance control method. In the third embodiment, in a case where there is a possibility that a driver feels uncomfortable when simple reverse playback is performed, a route is recalculated (regenerated) to realize natural traveling with less discomfort.

Hereinafter, an example in which the backward movement assistance control of the present embodiment is applied to the first embodiment will be described in detail, but the backward movement assistance control can be similarly applied to the second embodiment.

System Configuration of Driving Assistance Device

Figure 19:
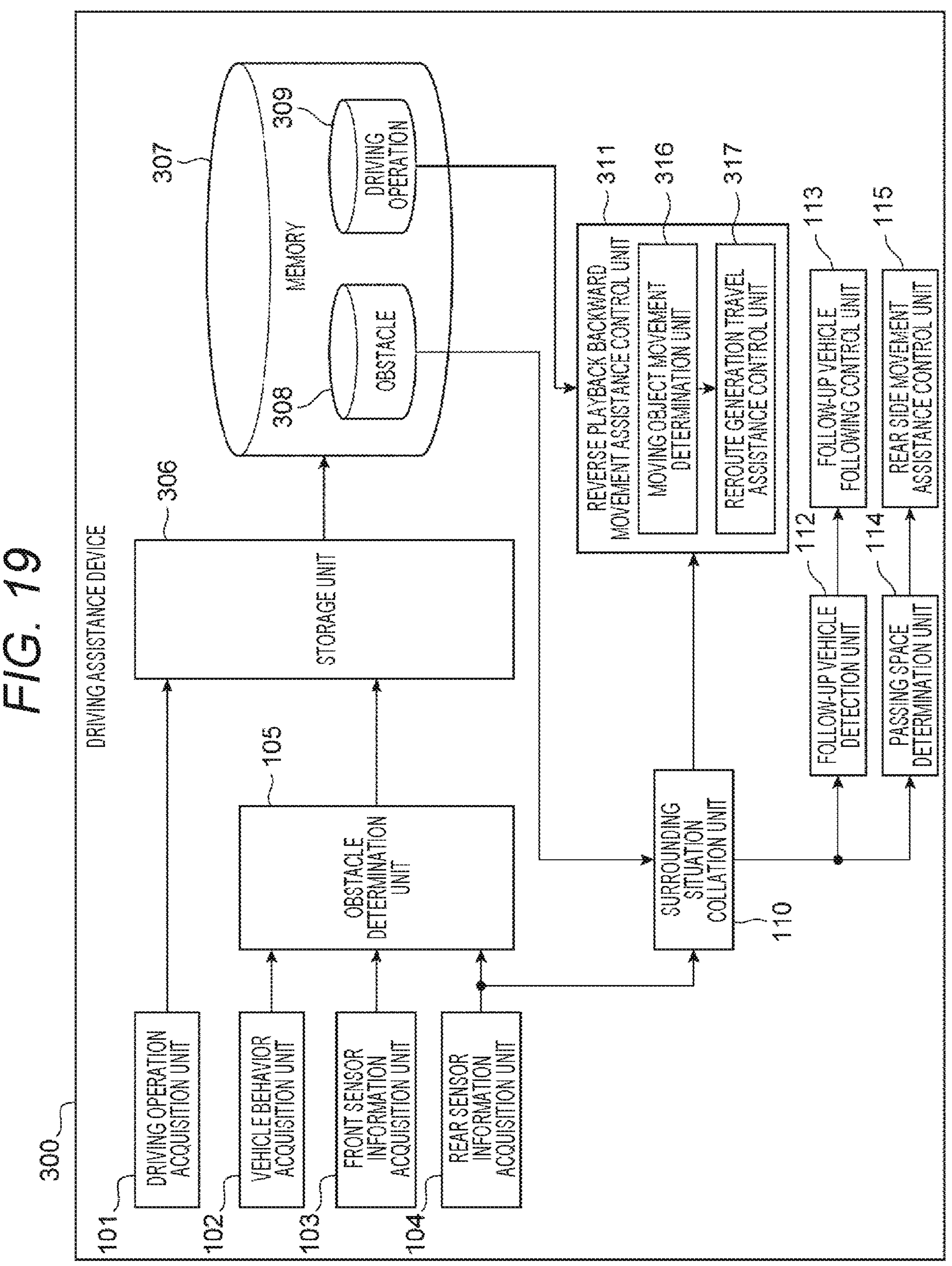
FIG. 19 is a system configuration diagram of a driving assistance device according to a third embodiment of the present invention.

FIG. 19 is a system configuration diagram of a driving assistance device 300 according to a third embodiment of the present invention.

The driving assistance device 300 is a computer that controls the vehicle 10, and executes a program stored in a storage medium to function as a driving operation acquisition unit 101, a vehicle behavior acquisition unit 102, a front sensor information acquisition unit 103, a rear sensor information acquisition unit 104, an obstacle determination unit 105, a storage unit 306, a surrounding situation collation unit 110, a reverse playback backward movement assistance control unit 311, a follow-up vehicle detection unit 112, a follow-up vehicle following control unit 113, a passing space determination unit 114, and a rear side movement assistance control unit 115.

That is, the driving assistance device 300 of the third embodiment includes the storage unit 306 and the reverse playback backward movement assistance control unit 311 instead of the storage unit 106 and the reverse playback backward movement assistance control unit 111 of the driving assistance device 100 of the first embodiment.

Figure 20:
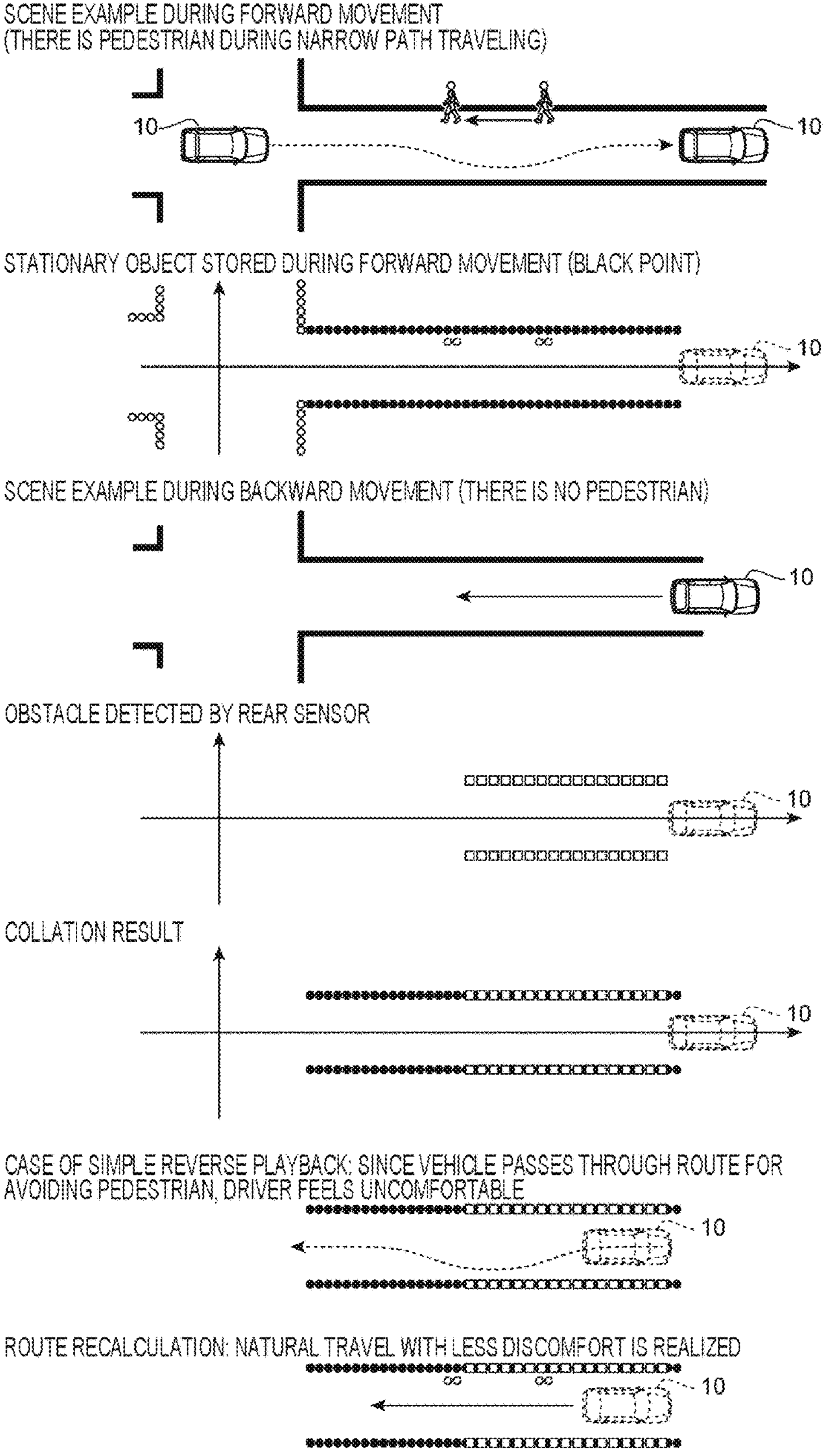
FIG. 20 is an explanatory diagram of the function and effect of backward movement assistance control according to the present embodiment.

As illustrated in FIG. 20, in a case where a pedestrian (moving object) is present at the time of forward movement of the vehicle 10 and the pedestrian (moving object) is absent at the time of backward movement, when simple reverse playback is performed, the vehicle passes through a route for avoiding the pedestrian (moving object), and thus there is a possibility that a driver of the vehicle 10 feels uncomfortable. The driving assistance device 300 of the present embodiment recalculates (regenerates) the route at the time of backward movement in the above-described case to realize natural backward travel with less discomfort.

Storage Unit 306

When storing the driving operation (information) acquired from the driving operation acquisition unit 101, the storage unit 306 stores a waypoint of an origin (for example, a center of a rear wheel axle) of the vehicle (host vehicle) 10 at the time of forward movement in the memory 307 as the driving operation (information) 309. The waypoint is preferably stored at a constant distance.

When storing the obstacle (information) acquired from the obstacle determination unit 105, the storage unit 306 stores not only a stationary object but also a moving object in the memory 307 as the obstacle (information) 308. The obstacle determination unit 105 determines (detects) left and right moving objects of the host vehicle, and the storage unit 306 also stores the left and right moving objects of the host vehicle in the memory 307 as obstacles (information) 308.

Reverse Playback Backward Movement Assistance Control Unit 311

During the reverse playback backward movement assistance control, the reverse playback backward movement assistance control unit 311 performs feedback control on the reverse playback operation so as to pass through the waypoint. By following waypoint in the reverse order, a backward travel following the same route is realized. The reverse playback backward movement assistance control unit 311 includes a moving object movement determination unit 316 and a reroute generation travel assistance control unit 317.

Moving Object Movement Determination Unit 316

The moving object movement determination unit 316 determines that the moving object (among the obstacles) has moved from the collation result of the surrounding situation collation unit 110. When the moving object movement determination unit 316 cannot determine that the moving object has moved, the reverse playback backward movement assistance control unit 311 assists backward travel by normal reverse playback.

Reroute Generation Travel Assistance Control Unit 317

When the moving object movement determination unit 316 determines that a moving object has moved, the reroute generation travel assistance control unit 317 generates a route when the host vehicle moves backward and performs the travel assistance control. At this time, the reroute generation travel assistance control unit 317 performs the travel assistance control by generating a route when the host vehicle moves backward in a state where the obstacle determined to have moved is removed from among the obstacles (information) 308 stored in the memory 307 by the storage unit 306.

Figure 21:
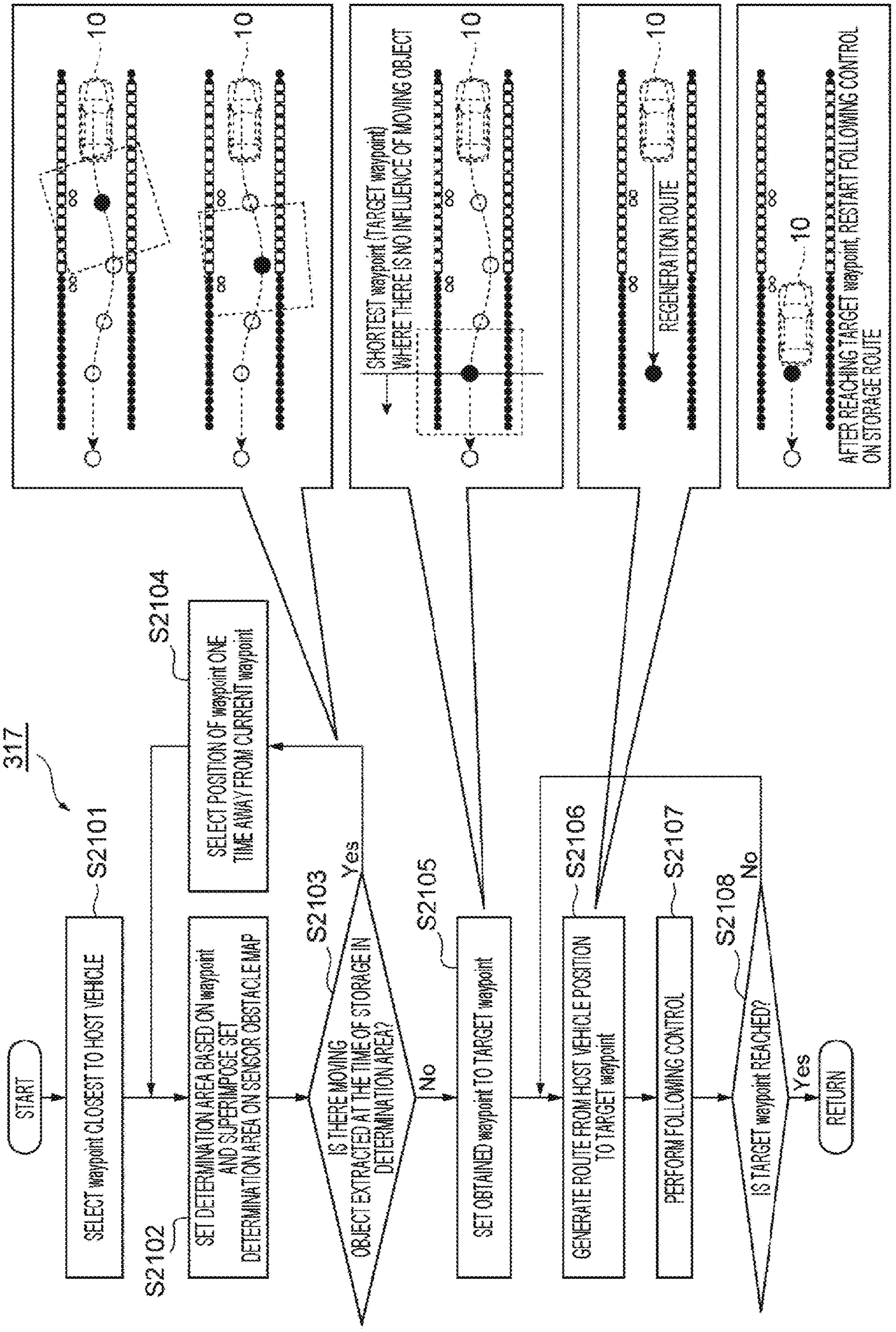
FIG. 21 is a flowchart of a reroute generation travel assistance control unit according to the third embodiment of the present invention.

FIG. 21 is a flowchart of the reroute generation travel assistance control unit 317 according to the third embodiment of the present invention. The flow illustrated in FIG. 21 is repeatedly performed at predetermined processing cycle a (periodically).

As illustrated in FIG. 21, in S2101, the reroute generation travel assistance control unit 317 selects the waypoint closest to the host vehicle 10.

In S2102, a preset determination area is set based on the waypoint, and is superimposed on the sensor obstacle map. The determination area is a predetermined area (for example, a rectangular area defined by the length in a vehicle front-rear direction and the width in the vehicle left-right direction) defined based on the origin of the vehicle.

In S2103, the presence or absence of the moving object extracted at the time of storage in the determination area is determined. When the moving object is present in the determination area, the process proceeds to S2104, and when the moving object is not present in the determination area, the process proceeds to S2105.

In S2104, the position of waypoint one time away from the current waypoint is selected, and the processing of S2102 and the determination of S2103 are repeated.

In S2105, that is, when it is determined in S2103 that there is no moving object in the determination area, the obtained waypoint is set as the target waypoint.

In addition, in S2105, that is, in a case where it is determined that there is no moving object in the determination area set based on the waypoint closest to the host vehicle 10 initially set in S2101, the waypoint closest to the host vehicle 10 is set as a target waypoint.

In S2106, a route from the current host vehicle position to the target waypoint is generated.

In S2107, the steering device, the driving device, the braking device, the transmission device, and the like are controlled to perform following control on the route (regeneration route) generated in S2106.

In S2108, it is determined whether the target waypoint is reached, and the processing of S2106 and the processing of S2107 are repeated until the target waypoint is reached.

That is, the reroute generation travel assistance control unit 317 first checks the presence or absence of a moving object around (in the determination area) based on the waypoint closest to the host vehicle 10 (S2101, S2102, S2103). When the moving object is present in the determination area, the waypoint is searched in the order of proximity from the host vehicle 10 (S2104, S2102, S2103), and the waypoint where no moving object is present in the determination area is searched and set as a target position (target waypoint) (S2105). A route is generated toward the set waypoint, and travel control (following control) is performed (S2106, S2107, S2108).

In other words, the reroute generation travel assistance control unit 317 sets, as a target waypoint, a waypoint where an obstacle (moving object) determined to have moved is not present among the obstacles (information) 308 stored in the memory 307 by the storage unit 306 around the waypoint (in the determination area) among the waypoints stored when the host vehicle moves forward, the waypoint being the closest (shortest) to the host vehicle 10, and generates a route from the position of the host vehicle 10 toward the set target waypoint to perform the travel assistance control.

As a result, the reroute generation travel assistance control unit 317 performs the travel assistance control by generating a route when the host vehicle moves backward in a state where the obstacle determined to have moved is removed from the obstacles (information) 308 stored in the memory 307 by the storage unit 306.

After reaching the target waypoint, the backward traveling can be assisted by normal reverse playback (following control on the storage route).

Operation and Effect

According to the present embodiment, in addition to the effects similar to those of the first and second embodiments, it is possible to realize natural traveling with less discomfort even in a case where a driver may feel uncomfortable when simple reverse playback is performed.

Therefore, it is possible to provide the driving assistance device 300 that is safe and convenient in a situation where reverse playback cannot be performed in passing on a narrow path or the like.

Fourth Embodiment

Next, a driving assistance device according to a fourth embodiment of the present invention will be described with reference to FIGS. 22 to 24. The fourth embodiment is different from the first, second, and third embodiments in the follow-up vehicle following control method. In the first, second, and third embodiments, the follow-up vehicle following control is performed based on the observation information of the rear sensor 14, but in the fourth embodiment, the follow-up vehicle following control is performed based on information transmitted and received by other-vehicle communication after the other-vehicle communication checking is performed.

Hereinafter, an example in which the follow-up vehicle following control of the present embodiment is applied to the first embodiment will be described in detail, but the follow-up vehicle following control can be similarly applied to the second and third embodiments.

System Configuration of Driving Assistance Device

Figure 22:
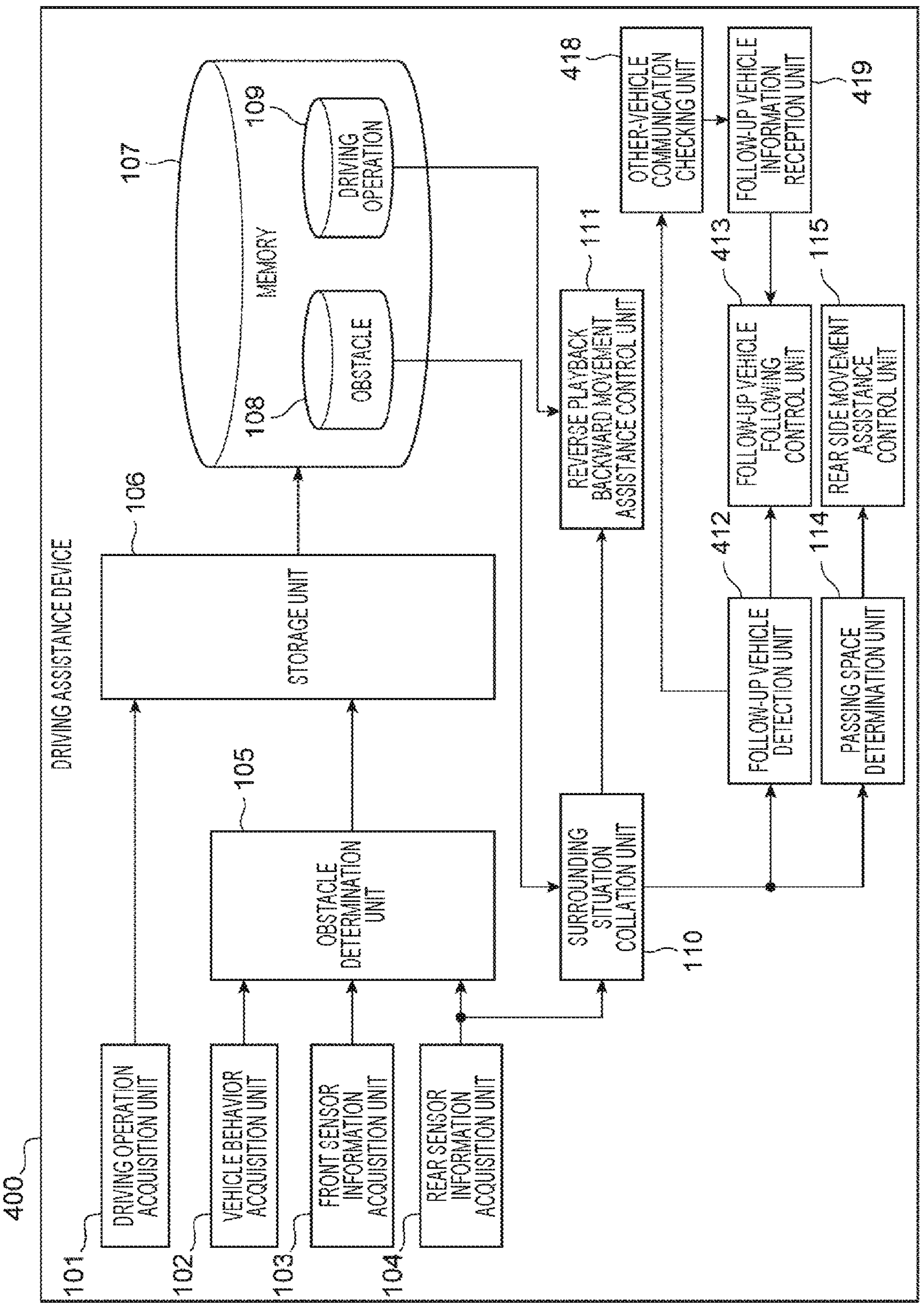
FIG. 22 is a system configuration diagram of a driving assistance device according to a fourth embodiment of the present invention.

FIG. 22 is a system configuration diagram of a driving assistance device 400 according to a fourth embodiment of the present invention.

The driving assistance device 400 is a computer that controls the vehicle 10, and executes a program stored in a storage medium to function as a driving operation acquisition unit 101, a vehicle behavior acquisition unit 102, a front sensor information acquisition unit 103, a rear sensor information acquisition unit 104, an obstacle determination unit 105, a storage unit 106, a surrounding situation collation unit 110, a reverse playback backward movement assistance control unit 111, a follow-up vehicle detection unit 412, a follow-up vehicle following control unit 413, an other-vehicle communication checking unit 418, a follow-up vehicle information reception unit 419, a passing space determination unit 114, and a rear side movement assistance control unit 115.

That is, the driving assistance device 400 of the fourth embodiment includes the follow-up vehicle detection unit 412 and the follow-up vehicle following control unit 413 instead of the follow-up vehicle detection unit 112 and the follow-up vehicle following control unit 113 of the driving assistance device 100 of the first embodiment, and further includes the other-vehicle communication checking unit 418 and the follow-up vehicle information reception unit 419.

Follow-Up Vehicle Detection Unit 412

As described in the first embodiment, the follow-up vehicle detection unit 412 determines (detects) the presence of the follow-up vehicle from the information of the surrounding situation collation unit 110. The follow-up vehicle detection unit 412 outputs a detection result to the follow-up vehicle following control unit 413 and the other-vehicle communication checking unit 418.

Other-Vehicle Communication Checking Unit 418

The other-vehicle communication checking unit 418 checks whether communication with other vehicles around the vehicle (host vehicle) 10 is possible. When the follow-up vehicle is detected by the follow-up vehicle detection unit 412, the other-vehicle communication checking unit 418 checks whether communication with the follow-up vehicle detected by the follow-up vehicle detection unit 412 is possible.

Follow-Up Vehicle Information Reception Unit 419

The follow-up vehicle information reception unit 419 has a function as a following control transmission/reception unit that communicates with other vehicle when communication with the other vehicle around the vehicle (host vehicle) 10 is enabled and transmits/receives information necessary for following control with respect to the other vehicle. When the other-vehicle communication checking unit 418 enables communication with the follow-up vehicle, the follow-up vehicle information reception unit 419 communicates with the follow-up vehicle and transmits and receives information necessary for following backward movement to the follow-up vehicle. The follow-up vehicle information reception unit 419 receives, from the other vehicle (follow-up vehicle), information such as a vehicle speed, acceleration/deceleration, steering (yaw angle), and a vehicle parameter as information necessary for following control to the other vehicle (follow-up vehicle).

Schematic Configuration of Other Vehicle

Figure 23:
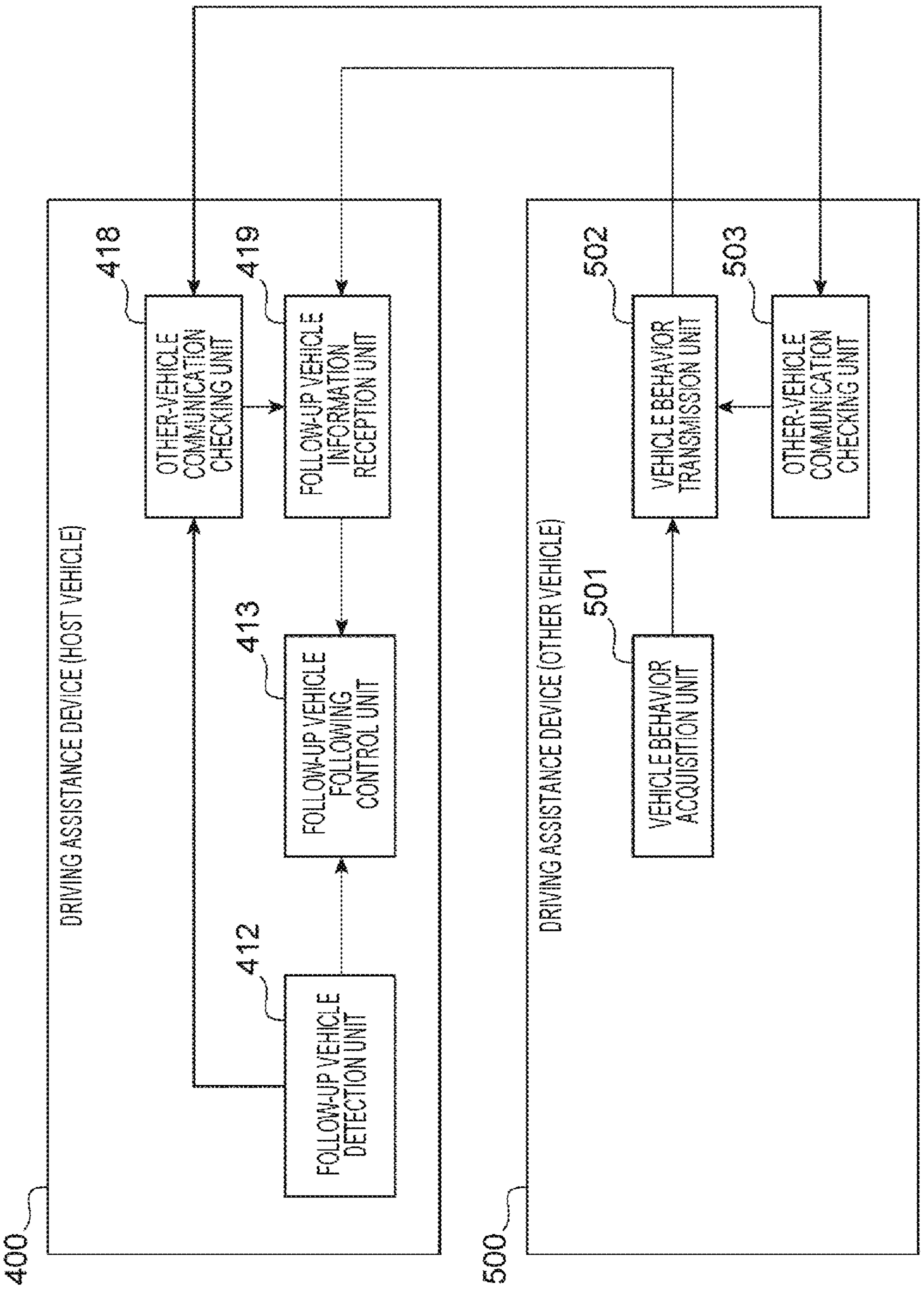
FIG. 23 is a diagram illustrating a communication connection relationship between a host vehicle and other vehicle.

FIG. 23 is a diagram illustrating a communication connection relationship between the host vehicle and other vehicle. The driving assistance device 500 of the other vehicle includes a vehicle behavior acquisition unit 501, a vehicle behavior transmission unit 502, and other-vehicle communication checking unit 503 in order to realize communication and information transmission/reception with the driving assistance device 400 of the host vehicle.

Vehicle Behavior Acquisition Unit 501

The vehicle behavior acquisition unit 501 acquires a behavior (information) of the vehicle from various sensors mounted on the vehicle. The vehicle behavior acquisition unit 501 acquires, for example, behavior (information) such as a wheel speed (vehicle speed), acceleration/deceleration, steering (yaw angle), and a vehicle parameter of the vehicle.

Other-Vehicle Communication Checking Unit 503

The other-vehicle communication checking unit 503 checks whether communication with other vehicle (the host vehicle in this case) around the vehicle (the other vehicle in this case) is possible. The driving assistance device 400 of the host vehicle and the driving assistance device 500 of the other vehicle check whether to communicate with each other by communication between the other-vehicle communication checking unit 418 and the other-vehicle communication checking unit 503.

Vehicle Behavior Transmission Unit 502

The vehicle behavior transmission unit 502 has a function as a following control transmission/reception unit that communicates with other vehicle (here, the host vehicle) in a case where communication with other vehicle (here, the host vehicle) around the vehicle (here, the other vehicle) is possible and transmits/receives information necessary for following control with respect to the other vehicle. When the other-vehicle communication checking unit 503 enables communication with the preceding vehicle (the host vehicle 10), the vehicle behavior transmission unit 502 communicates with the preceding vehicle (the host vehicle 10) and transmits and receives information necessary for following backward movement to the follow-up vehicle (the other vehicle in this case). The vehicle behavior transmission unit 502 transmits information acquired by the vehicle behavior acquisition unit 501 to the follow-up vehicle information reception unit 419 of the driving assistance device 400 of the host vehicle as information necessary for following backward movement.

Follow-Up Vehicle Following Control Unit 413

When the follow-up vehicle is detected behind the host vehicle by the follow-up vehicle detection unit 412, the follow-up vehicle following control unit 413 controls a steering device, a driving device, a braking device, a transmission device, and the like to perform follow-up vehicle following control for following the follow-up vehicle. When the follow-up vehicle information reception unit 419 receives the information necessary for the following backward movement of the follow-up vehicle, the follow-up vehicle following control unit 413 performs the following backward movement of the follow-up vehicle based on the received information.

Figure 24:
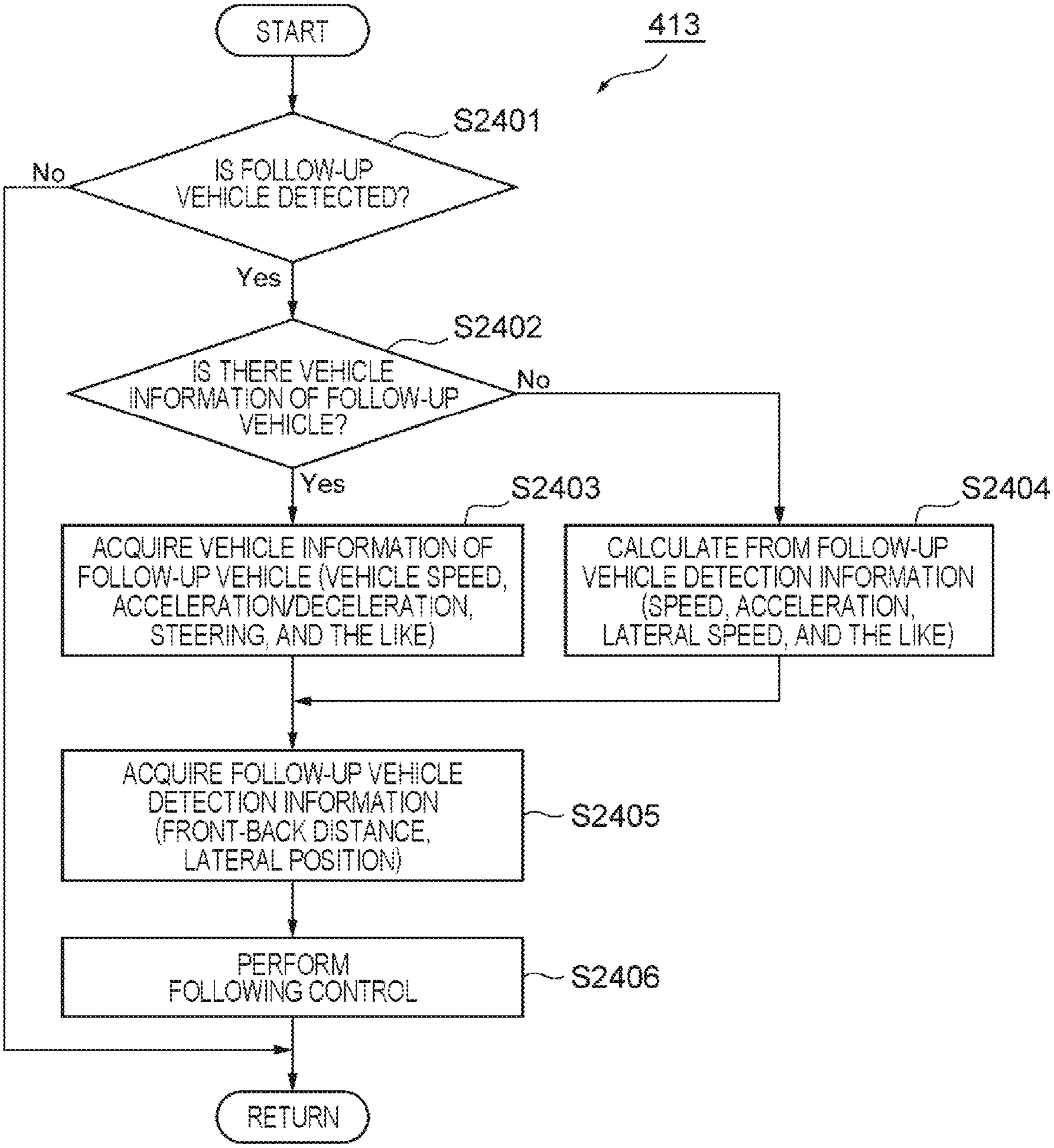
FIG. 24 is a flowchart of a follow-up vehicle following control unit according to a fourth embodiment of the present invention.

FIG. 24 is a flowchart of the follow-up vehicle following control unit 413 according to the fourth embodiment of the present invention. The flow illustrated in FIG. 24 is repeatedly performed at a predetermined processing cycle (periodically).

As illustrated in FIG. 24, the follow-up vehicle following control unit 413 determines whether the follow-up vehicle is detected by the follow-up vehicle detection unit 412 in S2401, and proceeds to S2402 when the follow-up vehicle is detected.

In S2402, the follow-up vehicle information reception unit 419 determines whether (whether the information has been received) there is information (vehicle information of the follow-up vehicle) necessary for following backward movement of the follow-up vehicle. When there is vehicle information of the follow-up vehicle, the process proceeds to S2403, and if there is no vehicle information of the follow-up vehicle, the process proceeds to S2404.

In S2403, the follow-up vehicle information reception unit 419 acquires information (vehicle information of the follow-up vehicle) necessary for following backward movement of the follow-up vehicle, and the process proceeds to S2405.

In S2404, vehicle information (speed, acceleration, lateral speed, and the like) of the follow-up vehicle is calculated from the follow-up vehicle detection information (that is, the sensor information acquired from the rear sensor information acquisition unit 104) of the rear sensor 14, and the process proceeds to S2405.

In S2405, the follow-up vehicle detection information (that is, the sensor information acquired from the rear sensor information acquisition unit 104) (front-back distance (relative distance in front-back direction or traveling direction), lateral position (relative position in direction orthogonal to lateral direction or traveling direction), and the like) of the rear sensor 14 is acquired, and the process proceeds to S2406.

In S2406, following control for the follow-up vehicle is performed based on the information acquired in S2403 or S2404 and S2405.

Operation and Effect

According to the present embodiment, in addition to the effects similar to those of the first, second, and third embodiments, when information necessary for following backward movement from the follow-up vehicle to the follow-up vehicle can be received, the following backward movement to the follow-up vehicle can be performed based on the received information. Therefore, the travel control at the time of backward movement can be more accurately performed.

Therefore, it is possible to provide the driving assistance device 400 that is safe and convenient in a situation where reverse playback cannot be performed in passing on a narrow path or the like.

Summary

As described above, driving assistance devices 100, 200, 300, and 400 according to the present embodiment include:

a driving operation acquisition unit (101) that acquires a driving operation of a driver of the host vehicle;

a front observation information acquisition unit (front sensor information acquisition unit 103, front camera recognition information acquisition unit 203) that acquires front observation information (front sensor information) of a front observation unit (front sensor 13, front camera 23) that observes a surrounding situation in front of the host vehicle;

a rear observation information acquisition unit (rear sensor information acquisition unit 104) that acquires rear observation information (rear sensor information) of a rear observation unit (rear sensor 14) that observes a surrounding situation behind the host vehicle;

an obstacle determination unit (105, 205) that determines at least a stationary object and other objects among obstacles (around the host vehicle) by using front observation information (front sensor information) of the front observation unit and rear observation information (rear sensor information) of the rear observation unit when the host vehicle moves forward;

a storage unit (106, 306) that stores (in memory (107, 307)) at least a stationary object among the obstacles determined by the obstacle determination unit and the driving operation acquired by the driving operation acquisition unit; and a surrounding situation collation unit (110) that collates an obstacle behind the host vehicle obtained by the rear observation unit with a stationary object stored (in a memory) by the storage unit when the host vehicle moves backward along a route where the host vehicle has moved forward; and a reverse playback backward movement assistance control unit (111, 311) that assists backward travel by reverse playback of the driving operation stored (in a memory) by the storage unit when the host vehicle moves forward, when the host vehicle moves backward along a route where the host vehicle has moved forward, in which the reverse playback backward movement assistance control unit (111, 311) determines whether the reverse playback backward movement assistance is performed in accordance with a result of the collation obtained by the surrounding situation collation unit (110).

That is, the driving assistance devices 100, 200, 300, and 400 of the present embodiment store the driving operation of the driver and the surrounding obstacle information at the time of the forward movement. At this time, the information of the front sensor 13 (or the front camera 23) and the information of the rear sensor 14 are integrated to determine and store the object type (stationary object, moving object). After the backward movement assistance is started, the surrounding obstacles of the rear sensor 14 are collated with the stored surrounding obstacles, and execution of the backward movement assistance based on the stored driving operation is determined according to the collation result.

Figure 25:
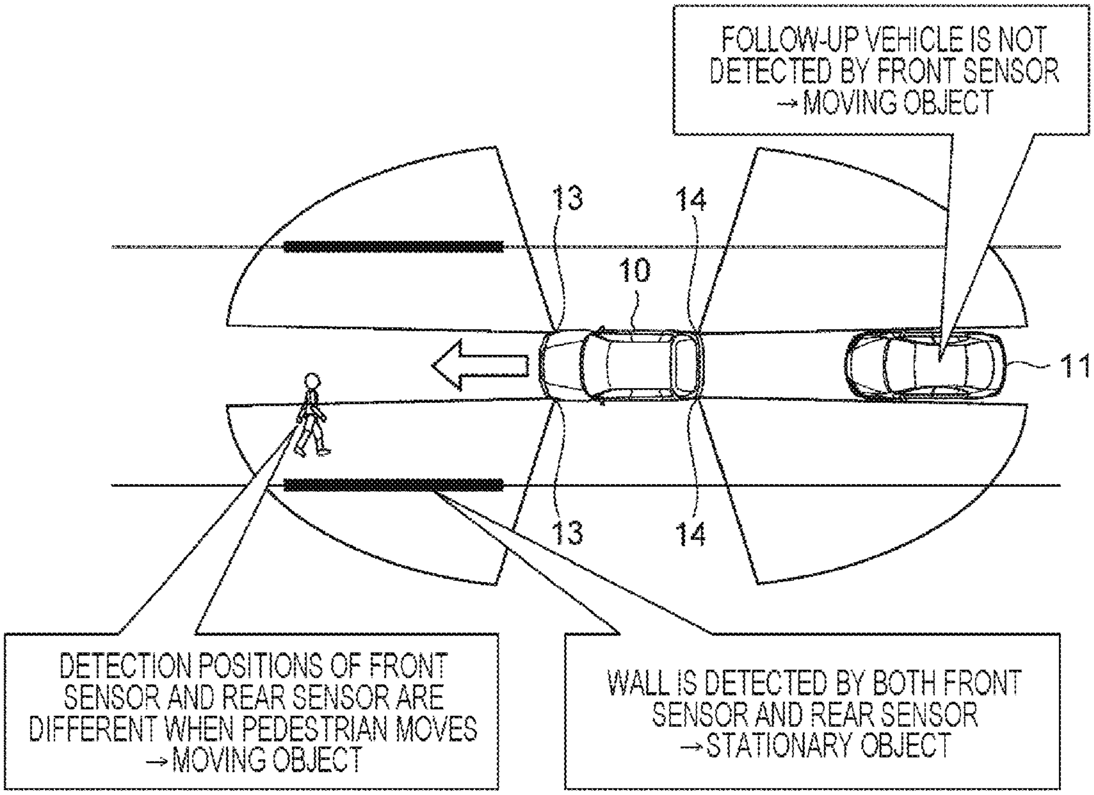
FIG. 25 is an explanatory diagram of an example of an object type determination unit of the driving assistance device according to the present invention.

As an example of the object type determination unit, the object type is determined by collating detection positions of both the front sensor 13 and the rear sensor 14. For example, the wall is detected by both the front sensor 13 and the rear sensor 14, and can be determined as a stationary object. When the pedestrian moves, the detection positions of the front sensor 13 and the rear sensor 14 are different, so that the pedestrian can be determined as a moving object. Since the follow-up vehicle is not detected by the front sensor 13, it can be determined as a moving object (see first embodiment, FIG. 25, or the like).

Figure 26:
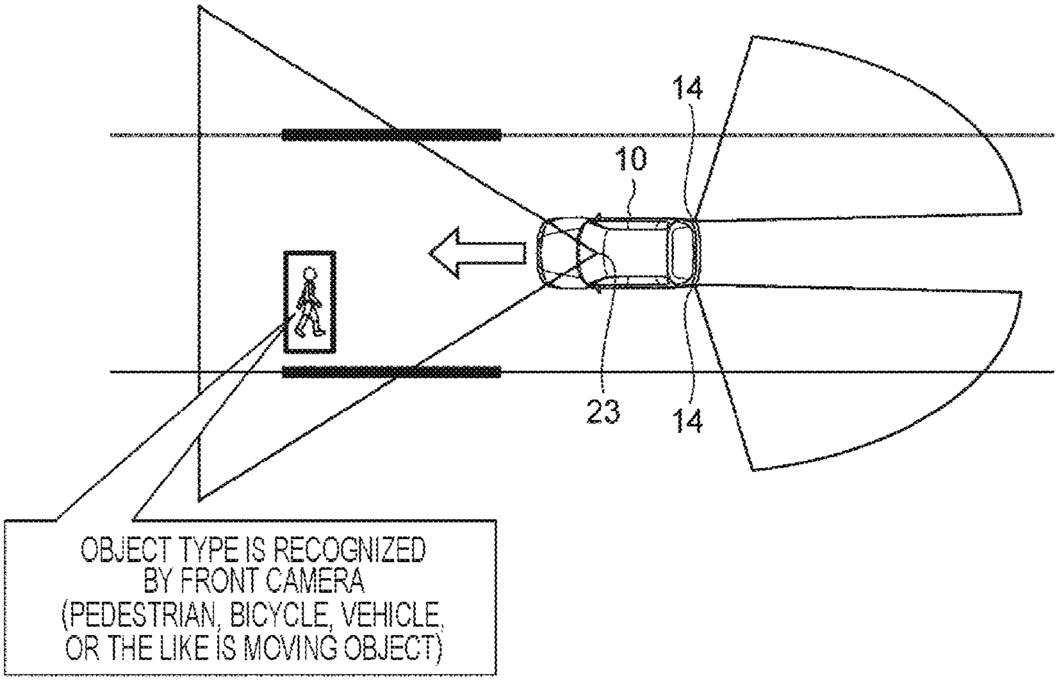
FIG. 26 is an explanatory diagram of another example of the object type determination unit of the driving assistance device according to the present invention.

In addition, as another example of the object type determination unit, the object type is determined based on information (pedestrian, bicycle, vehicle, or the like) recognized by the front camera 23. For example, a pedestrian, a bicycle, a vehicle, or the like can be determined as a moving object by (the image of) the front camera 23 (see second embodiment, FIG. 26, or the like). In this case, even when a pedestrian, a bicycle, a vehicle, or the like is stopped, it can be determined as a moving object.

According to the present embodiment, since moving objects such as a stopped vehicle and a pedestrian are distinguished and stored, it is possible to recognize that a moving object such as a stopped vehicle and a pedestrian present at the time of forward movement has moved and lost at the time of backward movement. Similarly, in a case where an area stored as an obstacle that does not move (stationary object) cannot be currently detected, it is possible to recognize that the area cannot be detected due to a failure of a sensor or the like at the time of backward movement.

Furthermore, even in a case where a follow-up vehicle is present at the time of forward movement, the follow-up vehicle and surrounding obstacles are stored in a distinguished manner. Therefore, for example, even in a case where there is no follow-up vehicle on the way, comparison at the time of backward movement can be correctly performed.

Therefore, it is possible to provide the driving assistance devices 100, 200, 300, and 400 that are safe and convenient in a situation where reverse playback cannot be performed in passing each other on a narrow path or the like.

FIG. 27 illustrates an application scene example and an operation example of the driving assistance device according to the present embodiment.

In the known technique, the reverse playback cannot be performed in a scene where a pedestrian or a bicycle moves, a scene where a follow-up vehicle is present (when the follow-up vehicle disappears on the way), a scene where a tandem stopped vehicle disappears after passing sideways, a scene where a construction area or a fence at a construction site moves, and a scene where a bicycle or a two-wheeled vehicle placed on a road shoulder or the like disappears. In addition, in a scene where there is a following bicycle or a two-wheeled vehicle, reverse playback is started at the start of backward movement.

In the present embodiment, in a scene where a pedestrian or a bicycle moves, when it is determined that the object is a moving object, control is performed as it is, and when it is determined that no sensor is detected, attention is attracted to the driver. In addition, in a scene where there is a follow-up vehicle, reverse playback is performed when there is no follow-up vehicle, and following control for the follow-up vehicle is performed when there is a follow-up vehicle. In addition, it is possible to perform evacuation control to an empty space (passing space) in a scene where the tandem stopped vehicle disappears after passing sideways. In addition, even in a scene where a fence of a construction area or a construction site has moved, evacuation control can be performed if there is an empty space (passing space). In addition, in a scene where a bicycle or a two-wheeled vehicle placed on a road shoulder or the like disappears, control is performed assuming that there is no bicycle or two-wheeled vehicle. In addition, in a scene where there is a following bicycle or a two-wheeled vehicle, the reverse playback is stopped at the start of backward movement, and attention to the driver, manual switching, and the like are performed.

Therefore, according to the present embodiment, the number of control patterns applicable in each scene is increased as compared with the known technique, and thus the convenience of the driver is improved.

Note that, in the above-described embodiment, the case where backward travel is assisted (by reverse playback or the like) when the host vehicle 10 moves backward (travels backward) on the route where the host vehicle 10 has moved forward has been exemplified. However, the traveling mode is not limited to this. For example, the traveling mode can be similarly applied to a case where driving travel is assisted when the host vehicle changes the direction of the route where the host vehicle has traveled (for example, moved forward) and travels (for example, moves forward) again, a case where driving travel is assisted when the host vehicle 10 travels (for example, moves forward) on the route where the host vehicle 10 has traveled (for example, moved forward) again (for example, on the same route), and a case where driving travel is assisted when the host vehicle moves forward on the route where the host vehicle has moved backward.

That is, the driving assistance device of the present embodiment includes:

- a driving operation acquisition unit (101) that acquires a driving operation of a driver of the host vehicle;
- a first observation information acquisition unit (front sensor information acquisition unit 103, front camera recognition information acquisition unit 203) that acquires first observation information (sensor information) of a first observation unit (front sensor 13, front camera 23) that observes a surrounding situation of the host vehicle;
- a second observation information acquisition unit (rear sensor information acquisition unit 104) that acquires second observation information (sensor information) of a second observation unit (rear sensor 14) that observes a direction different from the first observation unit (front sensor 13, front camera 23) in the surrounding situation of the host vehicle;

an obstacle determination unit (105, 205) that determines at least a stationary object and other objects among obstacles (around the host vehicle) by using first observation information (sensor information) of the first observation unit and second observation information (sensor information) of the second observation unit when the host vehicle travels;

a storage unit (106, 306) that stores (in memory (107, 307)) at least a stationary object among the obstacles determined by the obstacle determination unit and the driving operation acquired by the driving operation acquisition unit;

a surrounding situation collation unit (110) that collates the obstacle obtained from the first observation unit or the second observation unit with the obstacle (stationary object) stored (in the memory) by the storage unit when the host vehicle travels on the route on which the host vehicle has traveled again; and a travel assistance control unit (reverse playback backward movement assistance control unit 111, 311) that assists driving travel based on a driving operation stored (in a memory) by the storage unit during traveling of the host vehicle when the host vehicle travels again on a route on which the host vehicle has traveled, in which the travel assistance control unit (reverse playback backward movement assistance control unit 111, 311) can be configured as a device that determines whether to perform travel assistance in accordance with a result of collation obtained by the surrounding situation collation unit (110).

In addition, the driving assistance device of the above-described embodiment can be applied to a backward movement assistance system for an automobile, an automatic backward movement assistance system for a self-driving vehicle, a backward movement assistance system for a forklift, and the like.

Note that the present invention is not limited to the above-described embodiments, and includes various modifications. For example, the above-described embodiments have been described in detail for easy understanding of the present invention, and are not necessarily limited to those having all the described configurations. Further, a part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment.

In addition, some or all of the above-described configurations, functions, processing units, processing means, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function can be stored in a recording device such as a memory, a hard disk, and a solid state drive (SSD), or a recording medium such as an IC card, an SD card, and a DVD.

In addition, the control lines and the information lines indicate what is considered to be necessary for the description, and do not necessarily indicate all the control lines and the information lines necessary for the implementation. In practice, it may be considered that almost all the configurations are connected to each other.

REFERENCE SIGNS LIST

10 vehicle (host vehicle)
11 follow-up vehicle
13 front sensor (front observation unit, first observation unit)
14 rear sensor (rear observation unit, second observation unit)
23 front camera (front observation unit, first observation unit)
100 driving assistance device (first embodiment)
101 driving operation acquisition unit
102 vehicle behavior acquisition unit
103 front sensor information acquisition unit (front observation information acquisition unit, first observation information acquisition unit)
104 rear sensor information acquisition unit (rear observation information acquisition unit, second observation information acquisition unit)
105 obstacle determination unit
106 storage unit
107 memory
108 obstacle
109 driving operation
110 surrounding situation collation unit
111 reverse playback backward movement assistance control unit (travel assistance control unit)
112 follow-up vehicle detection unit
113 follow-up vehicle following control unit
114 passing space determination unit
115 rear side movement assistance control unit
200 driving assistance device (second embodiment)
203 front camera recognition information acquisition unit (front observation information acquisition unit, first observation information acquisition unit)
205 obstacle determination unit
300 driving assistance device (third embodiment)
306 storage unit
307 memory
308 obstacle
309 driving operation
311 reverse playback backward movement assistance control unit (travel assistance control unit)
316 moving object movement determination unit
317 reroute generation travel assistance control unit
400 driving assistance device (fourth embodiment)
412 follow-up vehicle detection unit
413 follow-up vehicle following control unit
418 other-vehicle communication checking unit
419 follow-up vehicle information reception unit (following control transmission/reception unit)
500 driving assistance device (other vehicle: follow-up vehicle)
501 vehicle behavior acquisition unit
502 vehicle behavior transmission unit (following control transmission/reception unit)
503 other-vehicle communication checking unit

The invention claimed is:

1. A driving assistance device comprising:

driving operation acquisition circuitry configured to acquire a driving operation of a driver of a host vehicle;

first observation information acquisition circuitry configured to acquire first observation information of first observation circuitry that observes a surrounding situation of the host vehicle;

second observation information acquisition circuitry configured to acquire second observation information of second observation circuitry that observes a direction different from a direction of the first observation circuitry in the surrounding situation of the host vehicle;

obstacle determination circuitry configured to determine at least a stationary object and other objects among obstacles by using first observation information of the first observation circuitry and second observation information of the second observation circuitry when the host vehicle travels, wherein the obstacle determination circuitry determines the same obstacle detected by both the first observation circuitry and the second observation circuitry as the stationary object;

a memory configured to store at least a stationary object among the obstacles determined by the obstacle determination circuitry and the driving operation acquired by the driving operation acquisition circuitry;

surrounding situation collation circuitry configured to collate an obstacle obtained from the first observation circuitry or the second observation circuitry with an obstacle stored in the memory when the host vehicle travels on a route on which the host vehicle has traveled again;

travel assistance control circuitry configured to assist driving travel based on a driving operation stored in the memory during traveling of the host vehicle when the host vehicle travels again on a route on which the host vehicle has traveled;

moving object movement determination circuitry configured to determine that a moving object has moved from a collation result of the surrounding situation collation circuitry; and reroute generation travel assistance control circuitry configured to generate a route of the host vehicle and perform travel assistance control in a state where the obstacle determined to have moved is removed from obstacle information stored in the memory when the moving object movement determination circuitry determines that the moving object has moved, wherein the travel assistance control circuitry determines whether to provide travel assistance according to a result of the collation obtained by the surrounding situation collation circuitry.

2. A driving assistance device comprising:

driving operation acquisition circuitry configured to acquire a driving operation of a driver of a host vehicle;

front observation information acquisition circuitry configured to acquire front observation information of front observation circuitry that observes a surrounding situation in front of the host vehicle;

rear observation information acquisition circuitry configured to acquire rear observation information of rear observation circuitry that observes a surrounding situation behind the host vehicle;

obstacle determination circuitry configured to determine at least a stationary object and other objects among obstacles by using front observation information of the front observation circuitry and rear observation information of the rear observation circuitry when the host vehicle moves forward, wherein the obstacle determination circuitry determines the same obstacle detected by both the front observation circuitry and the rear observation circuitry as the stationary object;

a memory configured to store at least a stationary object among the obstacles determined by the obstacle determination circuitry and the driving operation acquired by the driving operation acquisition circuitry;

surrounding situation collation circuitry configured to collate an obstacle behind the host vehicle obtained by the rear observation circuitry with the stationary object stored in the memory when the host vehicle moves backward along a route where the host vehicle has moved forward;

reverse playback backward movement assistance control circuitry configured to assist backward travel by reverse playback of a driving operation stored in the memory when the host vehicle moves forward, when the host vehicle moves backward along a route where the host vehicle has moved forward;

moving object movement determination circuitry configured to determine that a moving object has moved from a collation result of the surrounding situation collation circuitry; and reroute generation travel assistance control circuitry configured to generate a route of the host vehicle and perform travel assistance control in a state where the obstacle determined to have moved is removed from obstacle information stored in the memory when the moving object movement determination circuitry determines that the moving object has moved, wherein the reverse playback backward movement assistance control circuitry determines whether the reverse playback backward movement assistance is performed according to a result of the collation obtained by the surrounding situation collation circuitry.

3. The driving assistance device according to claim 2, wherein the front observation circuitry and the rear observation circuitry are configured using a sensor having the same characteristics, the surrounding situation collation circuitry determines, as a moving object, an object that is not present in the stationary object stored in the memory and is present in the current obstacle behind the host vehicle obtained from the rear observation circuitry in collation between the stationary object stored in the memory and the current obstacle behind the host vehicle obtained from the rear observation circuitry, and when the moving object is included at the time of collation, the reverse playback backward movement assistance control circuitry does not perform the reverse playback backward movement assistance.

4. The driving assistance device according to claim 3, wherein the surrounding situation collation circuitry determines that an object that is present in the stationary object stored in the memory and is not present in the current obstacle behind the host vehicle obtained from the rear observation circuitry is highly likely to be a failure of the sensor in the collation between the stationary object stored in the memory and the current obstacle behind the host vehicle obtained from the rear observation circuitry, and when it is determined that there is a high possibility of a failure in the sensor at the time of collation, the reverse playback backward movement assistance control circuitry does not perform the reverse playback backward movement assistance and alerts the driver.

5. The driving assistance device according to claim 3, further comprising:

follow-up vehicle detection circuitry configured to detect a follow-up vehicle from information of the surrounding situation collation circuitry; and follow-up vehicle following control circuitry configured to follow the follow-up vehicle when the follow-up vehicle is detected by the follow-up vehicle detection circuitry.

6. The driving assistance device according to claim 3, further comprising:

passing space determination circuitry configured to detect a passing space on a rear side of the host vehicle where the host vehicle can pass as a result of collation by the surrounding situation collation circuitry; and rear side movement assistance control circuitry configured to move to the passing space on the rear side of the host vehicle detected by the passing space determination circuitry to assist the passing.

7. The driving assistance device according to claim 2, wherein the front observation circuitry includes a sensor capable of determining a type of an object based on an image, the obstacle determination circuitry determines the stationary object from a detection result of the rear observation circuitry based on type information of the object determined by the front observation circuitry, the surrounding situation collation circuitry determines, as a moving object, an object that is not present in the stationary object stored in the memory and is present in the current obstacle behind the host vehicle obtained from the rear observation circuitry in collation between the stationary object stored in the memory and the current obstacle behind the host vehicle obtained from the rear observation circuitry, and when the moving object is included at the time of collation, the reverse playback backward movement assistance control circuitry does not perform the reverse playback backward movement assistance.

8. The driving assistance device according to claim 7, wherein the surrounding situation collation circuitry determines that an object that is present in the stationary object stored in the memory and is not present in the current obstacle behind the host vehicle obtained from the rear observation circuitry is highly likely to be a failure of the sensor in the collation between the stationary object stored in the memory and the current obstacle behind the host vehicle obtained from the rear observation circuitry, and when it is determined that there is a high possibility of the failure in the sensor at the time of the collation, the reverse playback backward movement assistance control circuitry does not perform the reverse playback backward movement assistance and alerts the driver.

9. The driving assistance device according to claim 7, wherein the obstacle determination circuitry detects left and right stopped vehicles or a construction area, the memory stores the left and right stopped vehicles or the construction area detected by the obstacle determination circuitry, and the driving assistance device further includes passing space determination circuitry configured to detect a passing space on a rear side of the host vehicle where the host vehicle can pass as a result of collation by the surrounding situation collation circuitry, and rear side movement assistance control circuitry configured to move to the passing space on the rear side of the host vehicle detected by the passing space determination circuitry to assist the passing.

10. The driving assistance device according to claim 3, further comprising:

moving object movement determination circuitry configured to determine that a moving object has moved from a collation result of the surrounding situation collation circuitry; and reroute generation travel assistance control circuitry configured to generate a route of the host vehicle and performs travel assistance control in a state where the obstacle determined to have moved is removed from obstacle information stored in the memory when the moving object movement determination circuitry determines that the moving object has moved.

11. The driving assistance device according to claim 7, wherein the obstacle determination circuitry detects left and right moving objects, the memory stores the left and right moving objects detected by the obstacle determination circuitry, and the driving assistance device further includes moving object movement determination circuitry configured to determine that a moving object has moved from a collation result of the surrounding situation collation circuitry, and reroute generation travel assistance control circuitry configured to generate a route of the host vehicle and performs travel assistance control in a state where the obstacle determined to have moved is removed from obstacle information stored in the memory when the moving object movement determination circuitry determines that the moving object has moved.

12. The driving assistance device according to claim 5, further comprising:

other-vehicle communication checking circuitry configured to check whether communication with other vehicle is enabled; and following control transmission/reception circuitry configured to perform communication with the other vehicle and transmits/receives information necessary for following control of the other vehicle when communication with the other vehicle is enabled, wherein when the follow-up vehicle is detected by the follow-up vehicle detection circuitry, the other-vehicle communication checking circuitry checks whether communication with the follow-up vehicle is enabled, when the communication with the follow-up vehicle is possible, the following control transmission/reception circuitry transmits and receives information necessary for following backward movement of the follow-up vehicle, and the follow-up vehicle following control circuitry performs following control of the follow-up vehicle based on the information.

13. The driving assistance device according to claim 5, wherein the follow-up vehicle detection circuitry determines, as a follow-up vehicle, an object having a predetermined width or more behind the host vehicle among objects that is not present in the stationary object stored in the memory and is present in the current obstacle behind the host vehicle obtained from the rear observation circuitry in the collation between the stationary object stored in the memory and the current obstacle behind the host vehicle obtained from the rear observation circuitry.

14. The driving assistance device according to claim 6, wherein the passing space determination circuitry determines, as the passing space, a space in which an object having a predetermined depth or more behind the host vehicle is present among objects present in the stationary object stored in the memory and not present in the current obstacle behind the host vehicle obtained from the rear observation circuitry in the collation between the stationary object stored in the memory and the current obstacle behind the host vehicle obtained from the rear observation circuitry.

15. The driving assistance device according to claim 2, wherein the reroute generation travel assistance control circuitry sets, as a target waypoint, a waypoint that is closest to the host vehicle and at which an obstacle determined to have moved is not present in the obstacle information stored in the memory around the waypoint among the waypoints stored when the host vehicle moves forward, and generates a route from the position of the host vehicle toward the target waypoint set to perform travel assistance control.

* * * * *